US012737229B2

(12) United States Patent
Teshima et al.

(10) Patent No.: US 12,737,229 B2
(45) Date of Patent: Sep. 15, 2026

(54) CONTENT OUTPUT CONTROLLER, CONTENT OUTPUT CONTROL METHOD, AND NON-TRANSITORY COMPUTER READABLE STORAGE MEDIUM FOR ALLOCATING CONTENTS TO AREAS OR ZONES

(71) Applicant: DENSO CORPORATION, Kariya-city (JP)

(72) Inventors: Kentaro Teshima, Kariya-city (JP); Daiki Kawashima, Kariya-city (JP); Takuya Kondo, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 482 days.

(21) Appl. No.: 18/453,294

(22) Filed: Aug. 21, 2023

(65) Prior Publication Data

US 2023/0393899 A1 Dec. 7, 2023

Related U.S. Application Data

(63) Continuation of application No. PCT/JP2022/003089, filed on Jan. 27, 2022.

(30) Foreign Application Priority Data

Feb. 25, 2021 (JP) ................................. 2021-028656

(51) Int. Cl.

| | |
|---|---|
| ***G06F 9/46*** | (2006.01) |
| ***G06F 9/451*** | (2018.01) |
| ***G06F 9/50*** | (2006.01) |

(52) U.S. Cl.

CPC ............ *G06F 9/5038* (2013.01); *G06F 9/451* (2018.02); *G06F 9/5033* (2013.01)

(58) Field of Classification Search

None

See application file for complete search history.

(56) References Cited

U.S. PATENT DOCUMENTS

| | | | | |
|---|---|---|---|---|
| 11,443,720 | B2 * | 9/2022 | Kawashima ........... | B60K 35/22 |
| 2016/0378334 | A1 * | 12/2016 | Liu ..................... | G06F 3/04886 715/794 |
| 2021/0097963 | A1 | 4/2021 | Kawashima et al. | |

FOREIGN PATENT DOCUMENTS

| | | |
|---|---|---|
| JP | 2020003649 A | 1/2020 |

* cited by examiner

*Primary Examiner* — Bing Zhao

(74) *Attorney, Agent, or Firm* — Harness, Dickey & Pierce, P.L.C.

(57) ABSTRACT

A content output controller includes a storage, an arbitration unit, and an output controller. The storage stores a rule definition. The arbitration unit arbitrates multiple contents according to the rule definition to satisfy a rule-based arbitration upon receiving an output request from an application. The output controller controls an output of the multiple contents allocated to multiple areas or multiple zones due to an arbitration of the plurality of contents. The arbitration unit selects an area as an arbitration target area from the multiple areas defined in a model or a zone as an arbitration target zone from the multiple zones defined in the model in response to receiving the output request from the application; arbitrates the arbitration target area or the arbitration target zone; and does not arbitrate remainder of the multiple areas or remainder of the multiple zones.

8 Claims, 18 Drawing Sheets

10
DISPLAY CONTROL DEVICE
APPLICATION A
APPLICATION B
APPLICATION C
REQUEST FROM APP
REQUEST FROM APP
REQUEST FROM APP
CONTROL UNIT
11
STORAGE
12
14
13
ARBITRATION UNIT
DISPLAY CONTROL UNIT
IN/OUT I/F
15
FIRST DISPLAY DEVICE
6
SECOND DISPLAY DEVICE
7
THIRD DISPLAY DEVICE
8
20
VARIOUS ECUS
VARIOUS SENSORS
VARIOUS SWITCHES
AUTONOMOUS DRIVING CONTROL DEVICE
16
17
18
19

FIG. 3
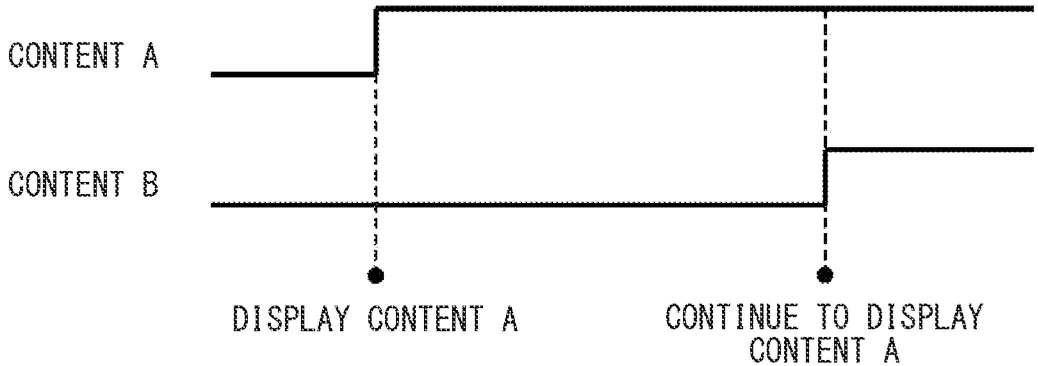
FIG. 4
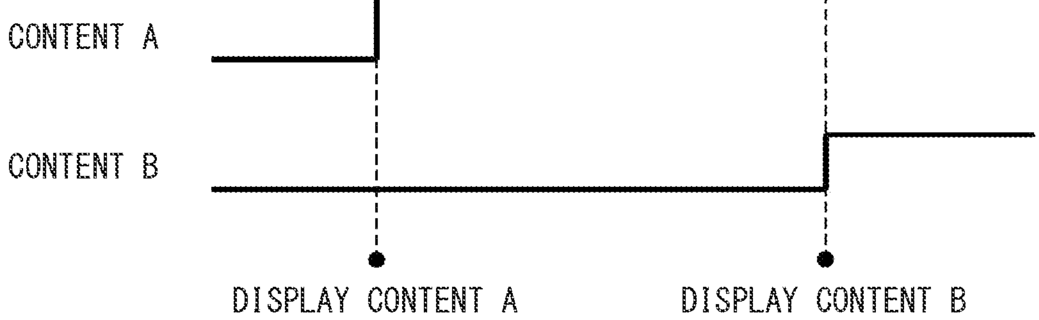

FIG. 7

| P | Q | P→Q |
|---|---|---|
| true | true | true |
| true | false | false |
| false | true | true |
| false | false | true |

| P | Q | P→Q |
|---|---|---|
| false | true | true |
| false | false | true |

TRUE IN EITHER CASE

FIG. 11

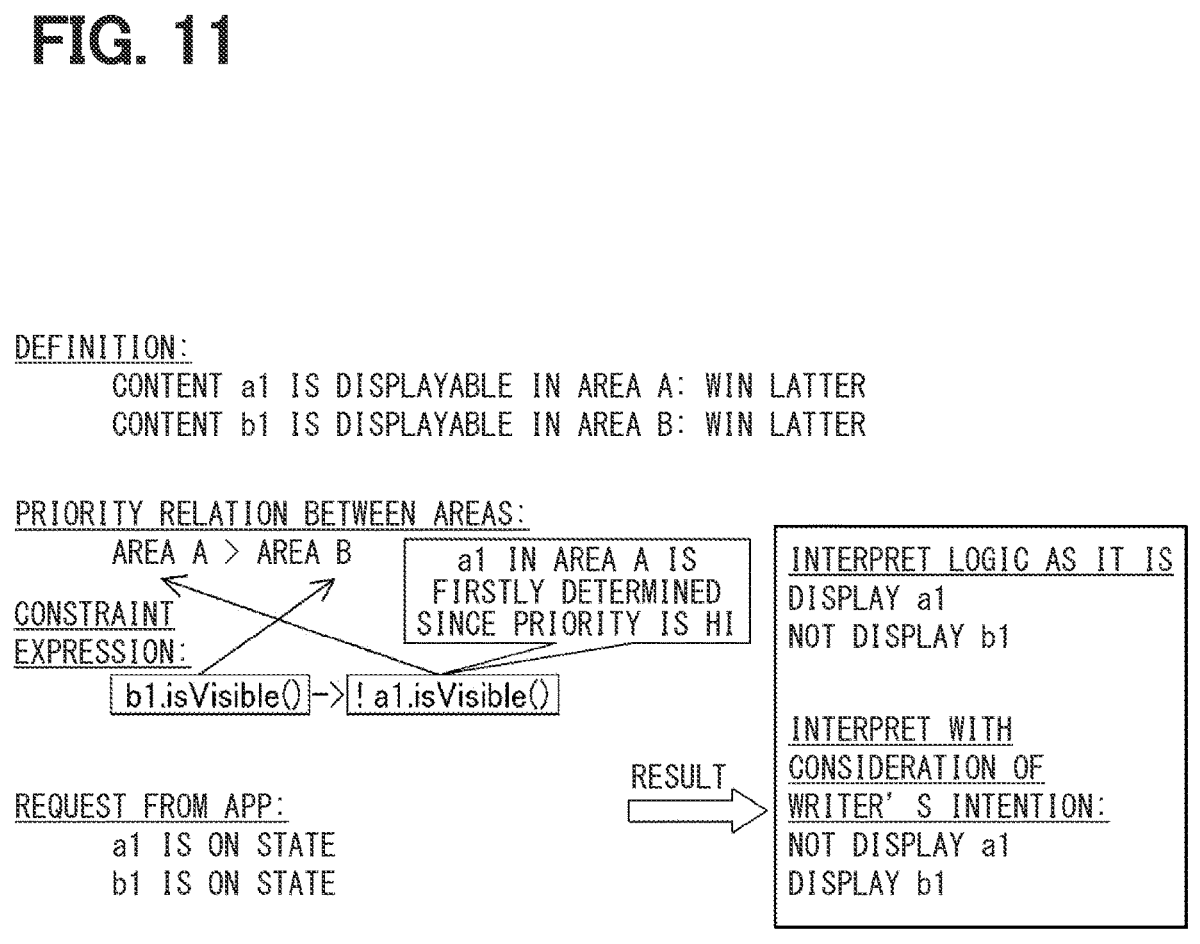

DEFINITION:
CONTENT a1 IS DISPLAYABLE IN AREA A: WIN LATTER
CONTENT b1 IS DISPLAYABLE IN AREA B: WIN LATTER

PRIORITY RELATION BETWEEN AREAS:
AREA A > AREA B a1 IN AREA A IS FIRSTLY DETERMINED SINCE PRIORITY IS HI

CONSTRAINT EXPRESSION:
b1.isVisible()->! a1.isVisible()

REQUEST FROM APP:
a1 IS ON STATE
b1 IS ON STATE

RESULT

INTERPRET LOGIC AS IT IS
DISPLAY a1
NOT DISPLAY b1

INTERPRET WITH CONSIDERATION OF WRITER' S INTENTION:
NOT DISPLAY a1
DISPLAY b1

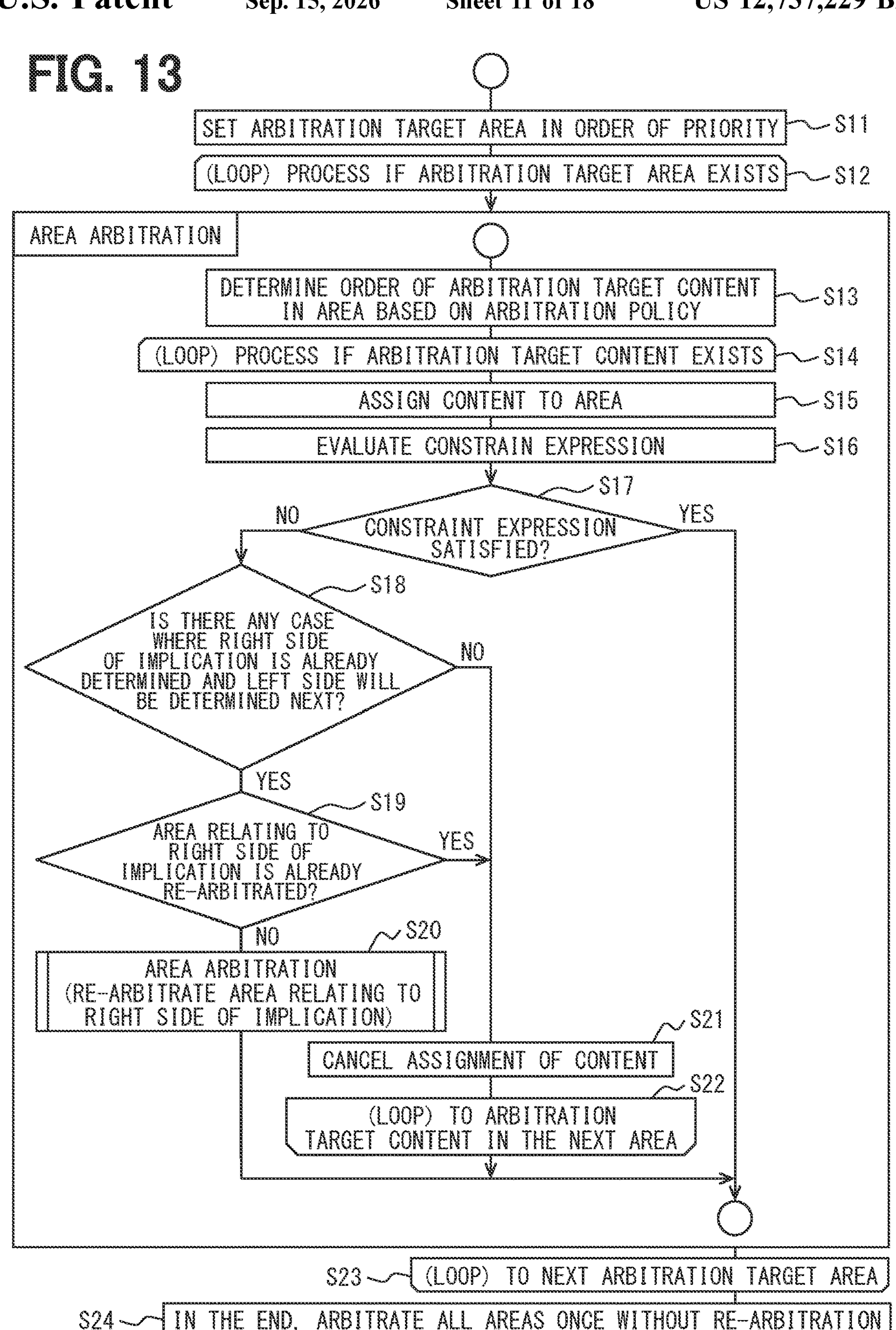
FIG. 13
SET ARBITRATION TARGET AREA IN ORDER OF PRIORITY
S11
(LOOP) PROCESS IF ARBITRATION TARGET AREA EXISTS
S12
AREA ARBITRATION
DETERMINE ORDER OF ARBITRATION TARGET CONTENT IN AREA BASED ON ARBITRATION POLICY
S13
(LOOP) PROCESS IF ARBITRATION TARGET CONTENT EXISTS
S14
ASSIGN CONTENT TO AREA
S15
EVALUATE CONSTRAIN EXPRESSION
S16
S17
NO
CONSTRAINT EXPRESSION SATISFIED?
YES
S18
IS THERE ANY CASE WHERE RIGHT SIDE OF IMPLICATION IS ALREADY DETERMINED AND LEFT SIDE WILL BE DETERMINED NEXT?
NO
YES
S19
AREA RELATING TO RIGHT SIDE OF IMPLICATION IS ALREADY RE-ARBITRATED?
YES
NO
S20
AREA ARBITRATION (RE-ARBITRATE AREA RELATING TO RIGHT SIDE OF IMPLICATION)
S21
CANCEL ASSIGNMENT OF CONTENT
S22
(LOOP) TO ARBITRATION TARGET CONTENT IN THE NEXT AREA
S23
(LOOP) TO NEXT ARBITRATION TARGET AREA
S24
IN THE END, ARBITRATE ALL AREAS ONCE WITHOUT RE-ARBITRATION

FIG. 17

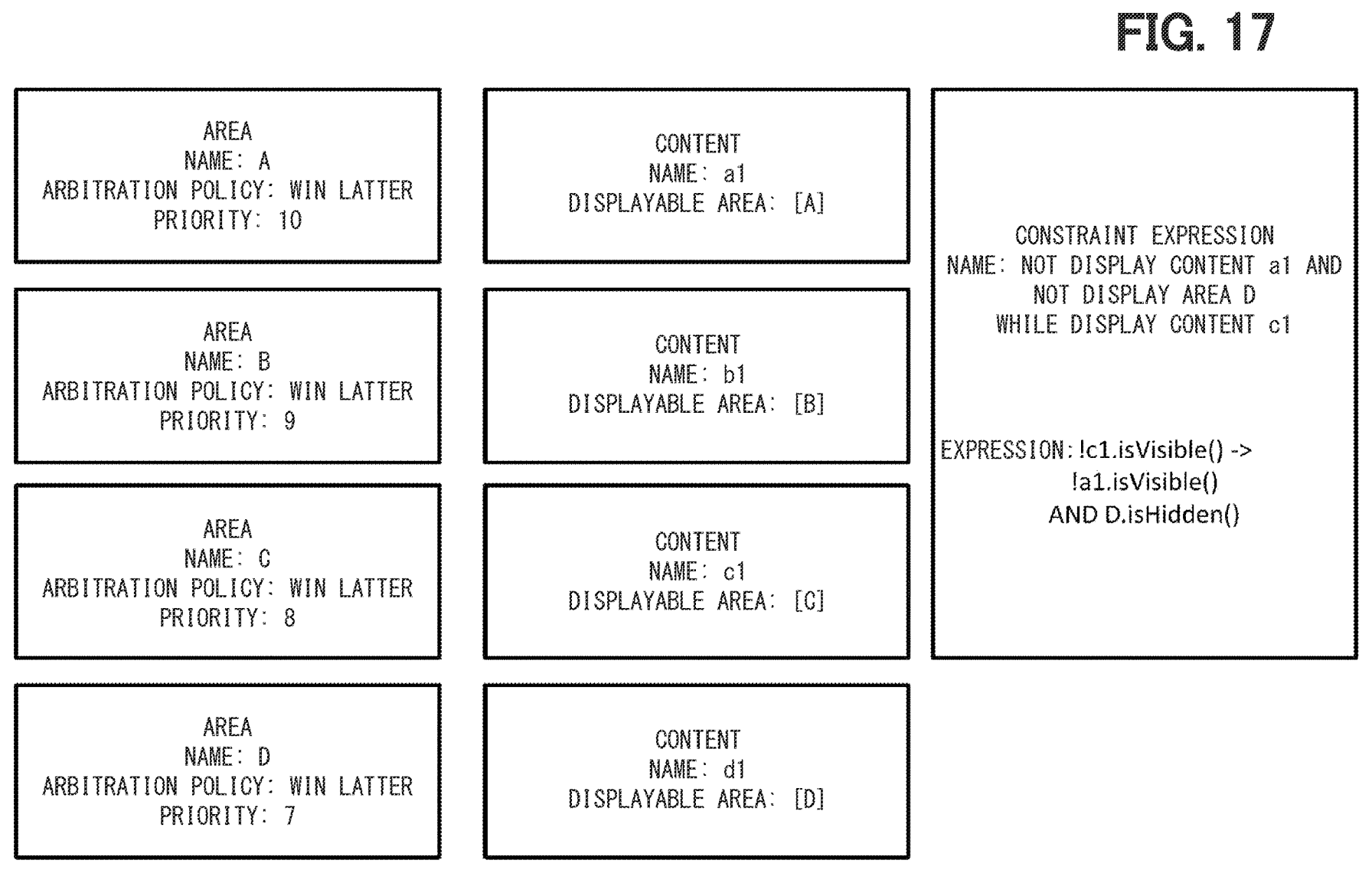

AREA
NAME: A
ARBITRATION POLICY: WIN LATTER
PRIORITY: 10

AREA
NAME: B
ARBITRATION POLICY: WIN LATTER
PRIORITY: 9

AREA
NAME: C
ARBITRATION POLICY: WIN LATTER
PRIORITY: 8

AREA
NAME: D
ARBITRATION POLICY: WIN LATTER
PRIORITY: 7

CONTENT
NAME: a1
DISPLAYABLE AREA: [A]

CONTENT
NAME: b1
DISPLAYABLE AREA: [B]

CONTENT
NAME: c1
DISPLAYABLE AREA: [C]

CONTENT
NAME: d1
DISPLAYABLE AREA: [D]

CONSTRAINT EXPRESSION
NAME: NOT DISPLAY CONTENT a1 AND NOT DISPLAY AREA D WHILE DISPLAY CONTENT c1

EXPRESSION: !c1.isVisible() -> !a1.isVisible() AND D.isHidden()

FIG. 18

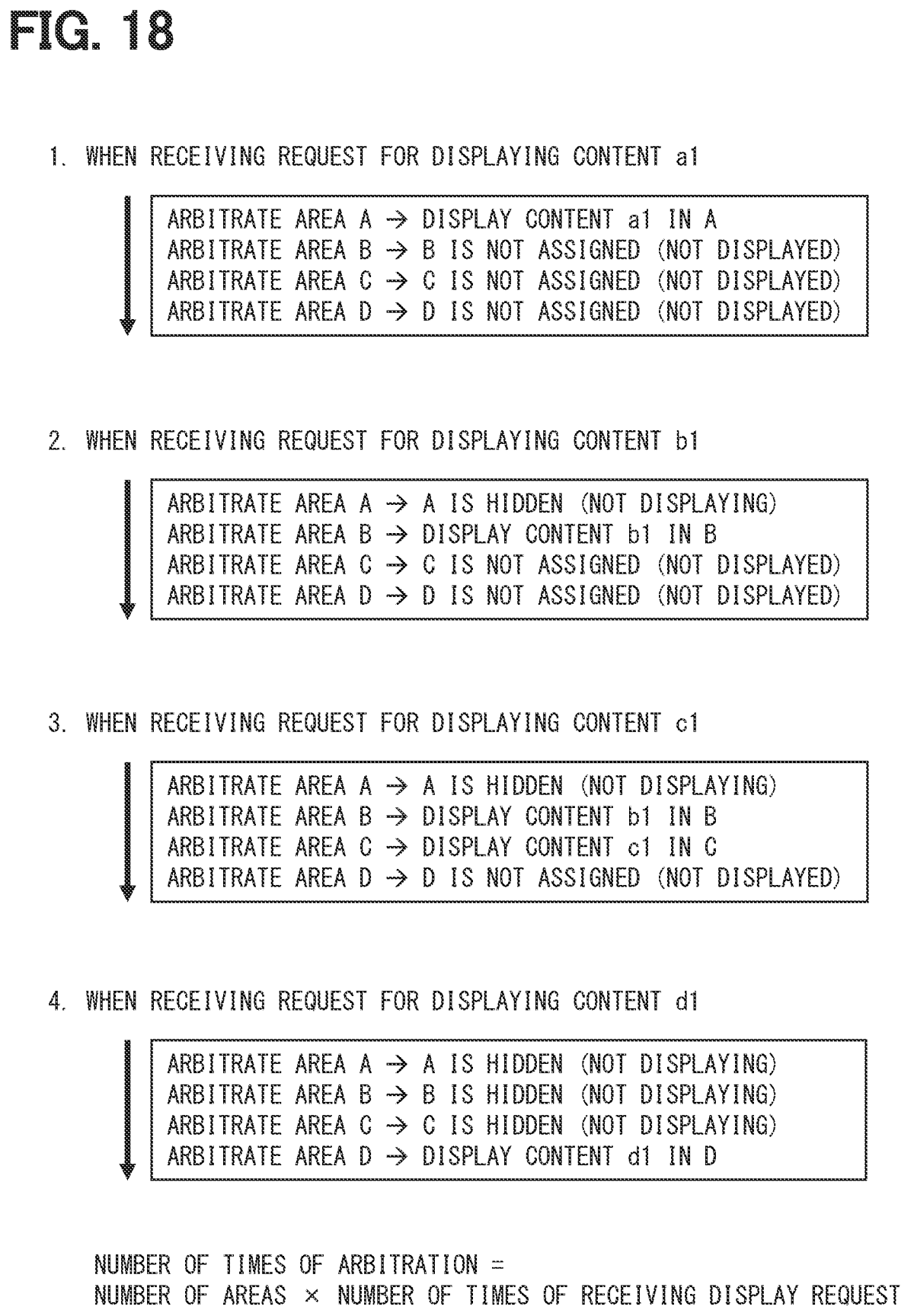

1. WHEN RECEIVING REQUEST FOR DISPLAYING CONTENT a1

ARBITRATE AREA A → DISPLAY CONTENT a1 IN A
ARBITRATE AREA B → B IS NOT ASSIGNED (NOT DISPLAYED)
ARBITRATE AREA C → C IS NOT ASSIGNED (NOT DISPLAYED)
ARBITRATE AREA D → D IS NOT ASSIGNED (NOT DISPLAYED)

2. WHEN RECEIVING REQUEST FOR DISPLAYING CONTENT b1

ARBITRATE AREA A → A IS HIDDEN (NOT DISPLAYING)
ARBITRATE AREA B → DISPLAY CONTENT b1 IN B
ARBITRATE AREA C → C IS NOT ASSIGNED (NOT DISPLAYED)
ARBITRATE AREA D → D IS NOT ASSIGNED (NOT DISPLAYED)

3. WHEN RECEIVING REQUEST FOR DISPLAYING CONTENT c1

ARBITRATE AREA A → A IS HIDDEN (NOT DISPLAYING)
ARBITRATE AREA B → DISPLAY CONTENT b1 IN B
ARBITRATE AREA C → DISPLAY CONTENT c1 IN C
ARBITRATE AREA D → D IS NOT ASSIGNED (NOT DISPLAYED)

4. WHEN RECEIVING REQUEST FOR DISPLAYING CONTENT d1

ARBITRATE AREA A → A IS HIDDEN (NOT DISPLAYING)
ARBITRATE AREA B → B IS HIDDEN (NOT DISPLAYING)
ARBITRATE AREA C → C IS HIDDEN (NOT DISPLAYING)
ARBITRATE AREA D → DISPLAY CONTENT d1 IN D

NUMBER OF TIMES OF ARBITRATION =
NUMBER OF AREAS × NUMBER OF TIMES OF RECEIVING DISPLAY REQUEST

FIG. 19

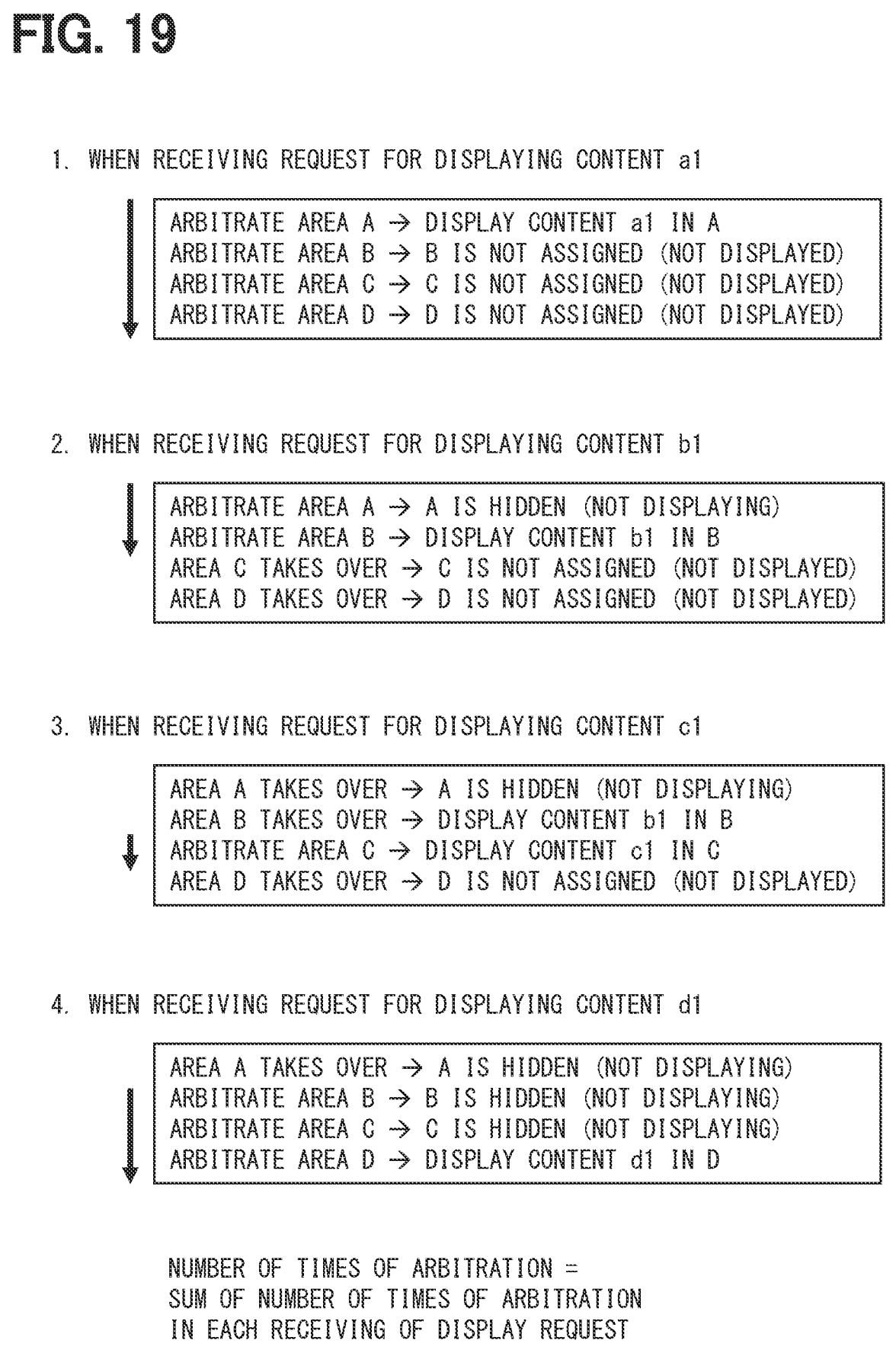

1. WHEN RECEIVING REQUEST FOR DISPLAYING CONTENT a1

ARBITRATE AREA A → DISPLAY CONTENT a1 IN A
ARBITRATE AREA B → B IS NOT ASSIGNED (NOT DISPLAYED)
ARBITRATE AREA C → C IS NOT ASSIGNED (NOT DISPLAYED)
ARBITRATE AREA D → D IS NOT ASSIGNED (NOT DISPLAYED)

2. WHEN RECEIVING REQUEST FOR DISPLAYING CONTENT b1

ARBITRATE AREA A → A IS HIDDEN (NOT DISPLAYING)
ARBITRATE AREA B → DISPLAY CONTENT b1 IN B
AREA C TAKES OVER → C IS NOT ASSIGNED (NOT DISPLAYED)
AREA D TAKES OVER → D IS NOT ASSIGNED (NOT DISPLAYED)

3. WHEN RECEIVING REQUEST FOR DISPLAYING CONTENT c1

AREA A TAKES OVER → A IS HIDDEN (NOT DISPLAYING)
AREA B TAKES OVER → DISPLAY CONTENT b1 IN B
ARBITRATE AREA C → DISPLAY CONTENT c1 IN C
AREA D TAKES OVER → D IS NOT ASSIGNED (NOT DISPLAYED)

4. WHEN RECEIVING REQUEST FOR DISPLAYING CONTENT d1

AREA A TAKES OVER → A IS HIDDEN (NOT DISPLAYING)
ARBITRATE AREA B → B IS HIDDEN (NOT DISPLAYING)
ARBITRATE AREA C → C IS HIDDEN (NOT DISPLAYING)
ARBITRATE AREA D → DISPLAY CONTENT d1 IN D

NUMBER OF TIMES OF ARBITRATION =
SUM OF NUMBER OF TIMES OF ARBITRATION
IN EACH RECEIVING OF DISPLAY REQUEST

CONTENT OUTPUT CONTROLLER, CONTENT OUTPUT CONTROL METHOD, AND NON-TRANSITORY COMPUTER READABLE STORAGE MEDIUM FOR ALLOCATING CONTENTS TO AREAS OR ZONES

CROSS REFERENCE TO RELATED APPLICATIONS

The present application is a continuation application of International Patent Application No. PCT/JP2022/003089 filed on Jan. 27, 2022, which designated the U.S. and claims the benefit of priority from Japanese Patent Application No. 2021-028656 filed on Feb. 25, 2021. The entire disclosures of all of the above applications are incorporated herein by reference.

TECHNICAL FIELD

The present disclosure relates to a content output controller, a content output control method, and a non-transitory computer readable storage medium.

BACKGROUND

In rule-based arbitration according to arbitration logic specification and rule-based syntax definition, areas or zones are defined as the arbitration target in descending order of value of the areas or the zones by one-pass logic, and content is allocated to each area or zone. The constraint expressions are evaluated after allocating the content, when all the constraint expressions are true (i.e., satisfied), the content assignment is successful, and when any constraint expression is false (i.e., not satisfied), the next content is allocated and the constraint expressions are evaluated again. When the content is not allocated to the area or the zone, or when not content is capable of being allocated to the area or the zone, it moves to the next area or zone. In this case, it may not be possible to obtain the result as intended by the specification developer who wants to design that the right side is established after the left side is established, since there is no weight on the right side and the left side. On the other hand, when the left side of the constraint expression is established and the right side has already been determined, the logic of re-arbitrating the area or zone on the right side is used.

SUMMARY

The present disclosure describes a content output controller, a content output control method, and a content output control program, each of which executes arbitration to satisfy rule-based arbitration according to a rule definition.

BRIEF DESCRIPTION OF DRAWINGS

Objects, features and advantages of the present disclosure will become more apparent from the following detailed description made with reference to the accompanying drawings. In the drawings:

FIG. 3 is a diagram showing priority arbitration;

FIG. 4 is a diagram showing latter-content-win arbitration;

FIG. 7 is a diagram showing the definition of truth values;

FIG. 11 is a diagram showing an example where the constraint expression is different from the specification developer's intention;

FIG. 13 is a flowchart showing an arbitration process;

FIG. 17 is a diagram showing definitions of areas, contents, and constraint expressions;

FIG. 18 is a diagram showing a sequence of the process in a comparative example;

FIG. 19 is a diagram showing a sequence of the process in the embodiment;

and

Figure 20:
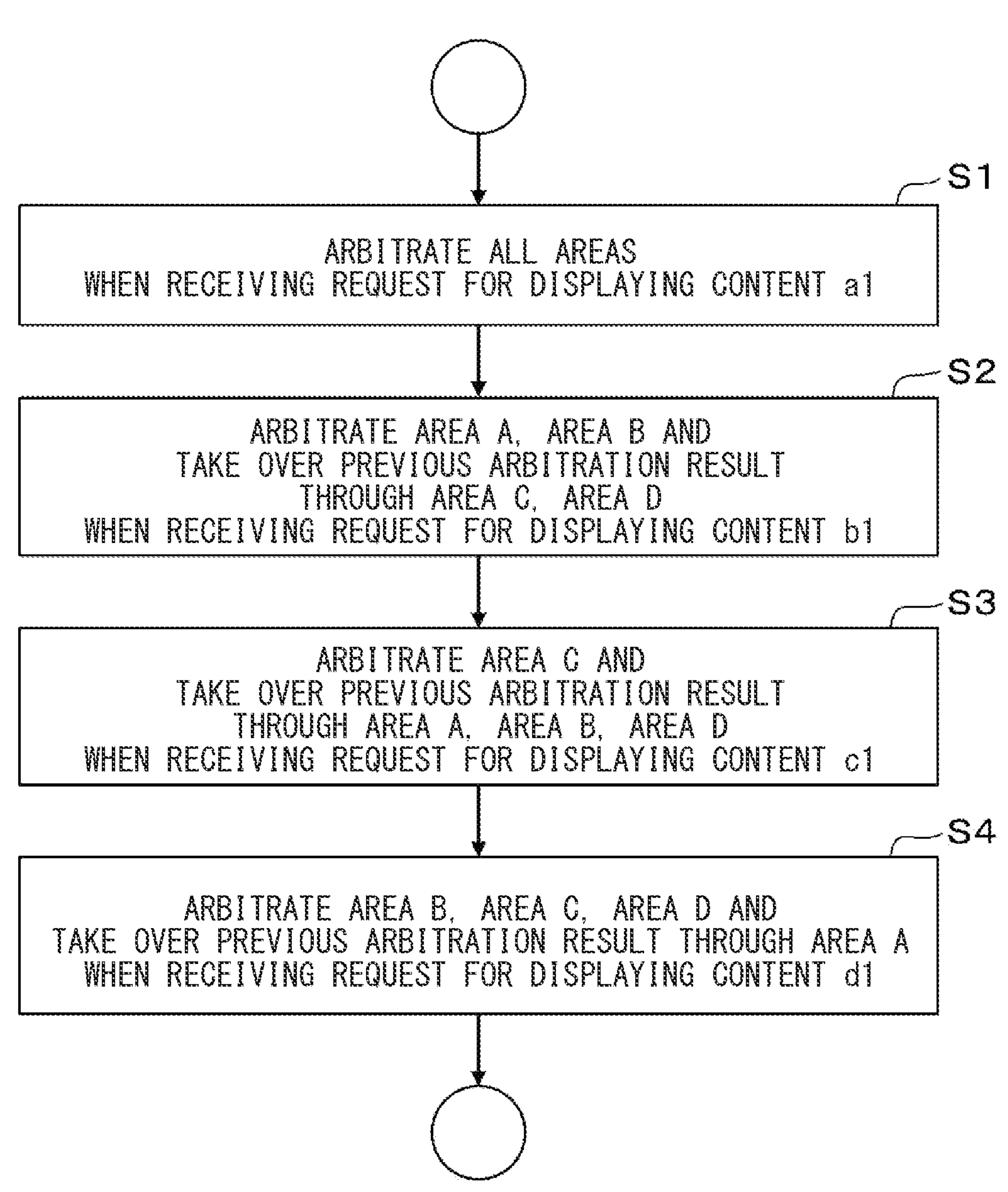

FIG. 20 is a flowchart of arbitration in a case where the display request is received in the order of the content a1, the content b1, the content c1 and the content d1.

DETAILED DESCRIPTION

The arbitration logic may execute arbitration for all areas or zones defined in the model for a single request. Each area or each zone may be affected by other areas or other zones or contents by the constraint expression and the output state may change, since it is difficult to know the level of influence on a change to a single element of the model and the arbitration is redone for all areas or zones. However, the number of times of arbitration increases in proportion to the expansion of the model, and sufficient execution may not be satisfied for the recent increase in content of cockpit displays. An increase in processing time due to the expansion of the model and the pressure on the memory capacity may be issues. It may be required to reduce the number of times of arbitration for solving the issues.

According to an aspect of the present disclosure, the memory stores rule definitions including arbitration policies that define basic arbitration for a case where contents are allocated to areas or zones, and constraint expressions. Upon receiving an output request from an application, the arbitration unit executes arbitration so as to satisfy rule-based arbitration according to rule definitions. The output control unit controls the output of the content allocated to the area or the zone by the arbitration executed by the arbitration unit. The arbitration unit selects an arbitration target area from the areas or an arbitration target zone from the zones defined in the model upon receiving the output request from the application; arbitrates the arbitration target area or the arbitration target zone; and does not arbitrate an area not being selected as the arbitration target area or a zone not being selected as the arbitration target zone.

When the output request from an application is received, the arbitration target area or the arbitration target zone is selected from the areas or zones defined in the model. Arbitration may only take place in the area selected as the arbitration target area or the zone selected as the arbitration target zone. As a result, the number of times of arbitration can be reduced to the extent that arbitration is not executed for areas not selected as arbitration target areas or zones not selected as arbitration target zones, and expansion of the model can be appropriately dealt with.

Figure 2:
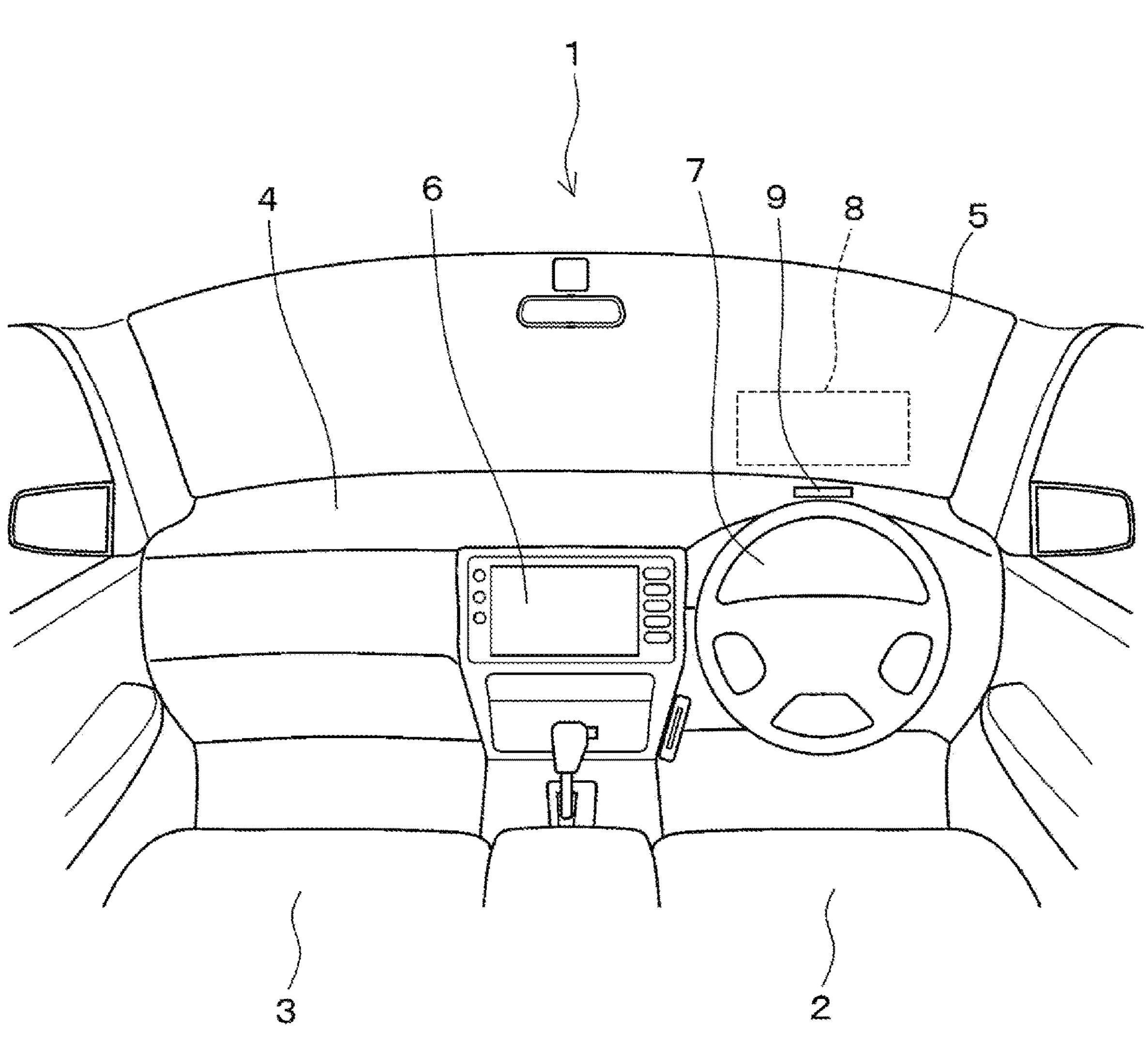
FIG. 2 is a perspective view showing a vehicle interior.

Hereinafter, an embodiment will be described with reference to the drawings. In this embodiment, a mode in which content is displayed in an area will be described, alternatively, a mode in which content is output as audio in a zone may be also applicable. That is, content output includes both the concept of content display and audio output, and output content includes the concept of both displayed content and audio output content. The zone may be referred to a section of a vehicle compartment of the vehicle. As shown in FIG. 2, a driver seat 2 and a passenger seat 3 are arranged in the vehicle compartment 1 of the vehicle, and an instrument panel 4 is arranged in front of them. A windshield 5 mounts on the front end of the instrument panel 4 so as to stand up. A first display device 6 and a second display device 7 are arranged on the instrument panel 4, and a third display device 8 is arranged on the windshield 5.

The first display device 6 is, for example, a center display including a full-color liquid crystal display device, and basically functions as a display unit for displaying non driving-related content that is not related to vehicle traveling control. The non driving-related content includes, for example, map information for navigation, audio information, telephone information, and the like. The first display device 6 also functions as a display unit that displays an image of the rear of the vehicle captured by the rear camera when the vehicle is moving backward.

The second display device 7 is, for example, a meter display including a full-color liquid crystal display device, and basically functions as a display unit for displaying power train content that is related to vehicle traveling control. The content of the power train is, for example, vehicle speed, engine speed, shift position, remaining amount of fuel, and the like.

The third display device 8 is a head-up display in which an image is projected from the display unit 9 arranged on the instrument panel 4 onto the windshield 5, and basically functions as a display unit that displays a driving related content, similar to the second display device 7. Each of the display devices 6 to 8 includes one or more areas for displaying the content. In such a configuration, content is displayed on each of the display devices 6 to 8, thereby providing the occupant with various types of information including the driving related content and non-driving related content.

Figure 1:
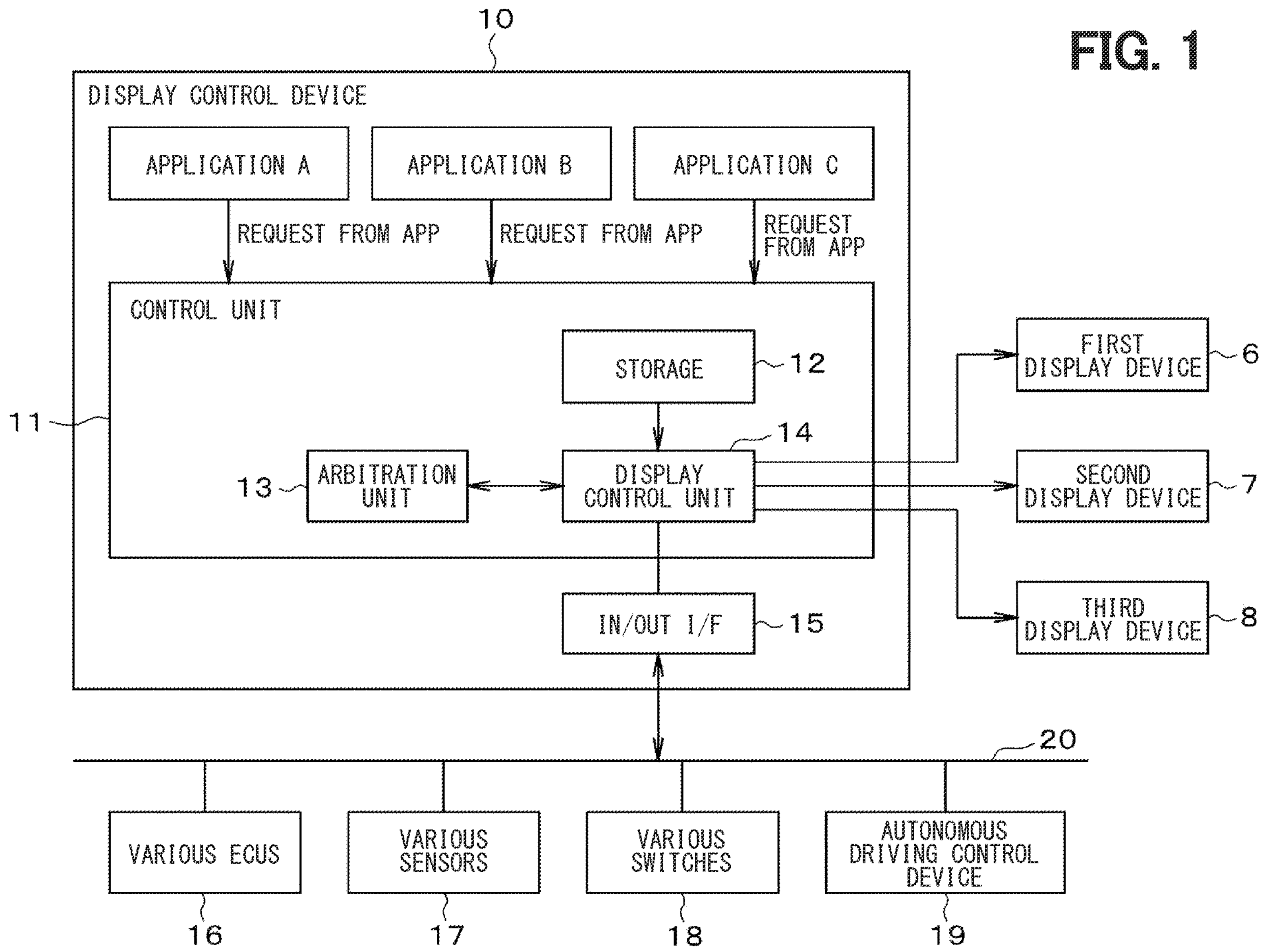
FIG. 1 is a functional block diagram showing a configuration of a display control device according to an embodiment.

As shown in FIG. 1, a display control device 10 has a control unit 11, and displays content in areas set in each of the display devices 6 to 8. The control unit 11 has a microcomputer including a CPU (Central Processing Unit), a ROM (Read Only Memory), a RAM (Random Access Memory), an I/O (Input/Output), and the like, and executes a display control program stored in a non-transitory tangible storage medium. The display control device 10 corresponds to a content output control device or a content output controller.

Applications A to C are stored in the display control device 10 in advance. When a content display request for a predetermined area of one or more of display devices 6 to 8 is generated, each of the applications A to C provide to interrupt and output an APP (application) request indicating the display device as the display target device, an area, and a content to the control unit 11.

The control unit 11 includes a memory 12, an arbitration unit 13 and a display control unit 14. The display control unit 14 corresponds to an output control unit. The control unit 11 controls the operation of the display control device 10 by executing the output control program. The memory 12 stores rule definitions. The rule definitions include arbitration policies that define basic arbitration when content is allocated to an area, and constraint expressions that describe properties that should be satisfied exceptionally. The memory 12 may also be referred to as a storage. The constraint expression may also be referred to as a constraint formula.

The arbitration policy is always set by any of priority arbitration, latter content win arbitration, and value-based arbitration. The constraint expression may not be limited to one, and may not be provided or may be provided with equations according to the intention of the specification developer.

Upon receiving a display request from an application, the arbitration unit 13 arbitrates content according to rule definitions so as to satisfy rule-based arbitration. The display control unit 14 is connected to various ECUs 16, various sensors 17, various switches 18, an autonomous driving device 19 and the like via an input/output I/F 15 through an in-vehicle network 20 such as CAN (Controller Area Network). The display control unit 14 controls display of the content allocated to the predetermined area by the arbitration unit 13. Arbitration logic can be created as a library, and rule-based arbitration can be arbitrarily set by registering or changing rule definitions in the library.

When allocating content to areas, different applications may issue APP requests at the same time, in which case arbitration is required. Note that the words "at the same time" does not mean simultaneous in terms of time, but mean the state that, when an APP request is output from an application, the content of another application is already being displayed, i.e., the APP requests from two different applications are in active at the same time.

When the APP requests are turned on at the same time, the content to be displayed in the area needs to be arbitrated. In a configuration that defines all behaviors such as which content is displayed in which area, it becomes difficult to define all behaviors when the number of contents increases. In the present embodiment, the rule-based arbitration is adopted such that the rule-based arbitration abstractly indicates which content should be displayed in which area. The rule-based arbitration will be described below.

(Rule-Based Arbitration)

The rule-based arbitration describes an arbitration method in which the content is arbitrated and allocated to an arbitrary area based on a predetermined rule. Area definitions, content definitions, and constraint expressions are required as rule definitions in rule-based arbitration. The phrase "allocated to" described in this specification may also be referred to as the phrase "assigned to".

(Area Definition)

The area definition defines the display location, the value of the display location, and the arbitration policy. Since arbitration is executed for each area, an arbitration policy is defined for each area. In the area, a frame for displaying the content on the display screens of the display devices 6 to 8 is defined. Only one content is allocated to an area. Area is defined as follows. (a) The allocated content is displayed in the area. (b) The area has an arbitration policy. (c) The area refers to the content that can be displayed. (d) The area has one or more sizes. Each area has a property. The priority, Z-order, arbitration policy, and size are set as properties.

(Priority)

The priority is a value (in a range between 0% and 100%) indicating the value of the area itself. The arbitration is executed in order from the area with the highest priority value.

(Z-Order)

The Z-order is a coordinate with respect to a height. The higher the value, the closer to the front it is displayed. When there are areas with the same priority, arbitration is executed in descending order of this value.

(Arbitration Policy)

The arbitration policy is one of priority arbitration, latter win arbitration, and value-based arbitration.

(Priority Arbitration)

The priority arbitration is an arbitration policy for each area, and as shown in FIG. 3, it is arbitration that displays the content having the highest priority among the contents that can be displayed in the area.

(Latter Win Arbitration)

The latter-content-win arbitration is an area-based arbitration policy. As shown in FIG. 4, the content of the last request in the area is displayed, and when the display of the last request content is finished, the second last request among the remaining contents is displayed.

(Value-Based Arbitration)

The value-based arbitration is an arbitration policy for the entire area, and is arbitration that displays the content that maximizes the calculated value obtained by multiplying the numerical value that quantifies the value of the content and the numerical value that quantifies the value of the area.

(Size)

Figure 5:
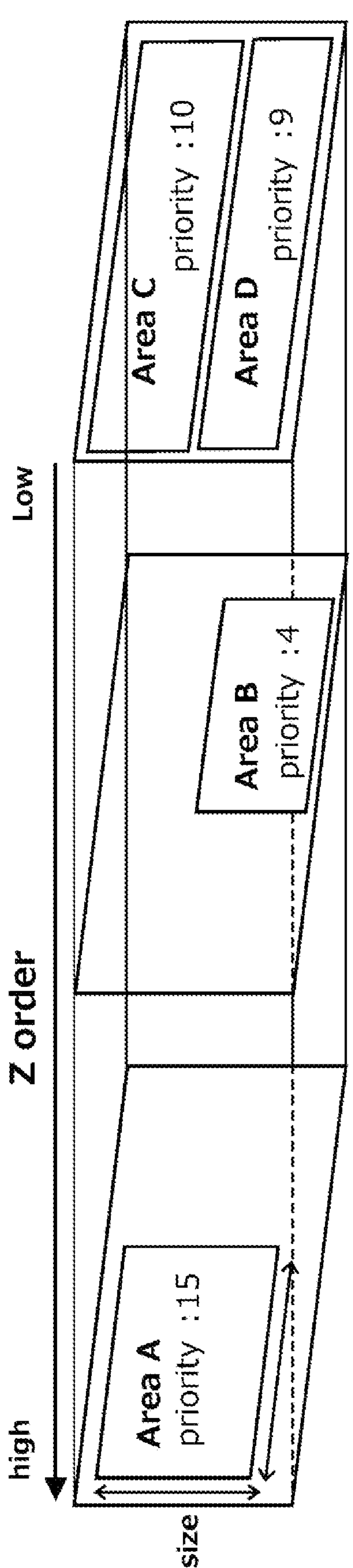
FIG. 5 is a diagram showing a relationship between a Z-order of an area and a priority.

The size is the size of the area, which is defined by a vertical size×a horizontal size. When multiple areas are defined, it is determined according to the size of the content. The relationship between the area Z-order and priority is as shown in FIG. 5.

(Content Definition)

The content definition defines the displayable area, the state of the content, and the value of the state of the content. The content can have multiple states, the content is allocated to the area, and the content status is displayed. The content defines and refers to the area in which the content itself can be displayed. In the content, the content to be displayed in the area defined on the display screens of the display devices 6 to 8 is defined. Only one content is allocated to an area. Content is defined as follows. (a) Content is allocated to the area. (b) The content refers to one or more areas in which the content itself can be displayed. (c) The content always has one or more states. (d) Content has one or more sizes.

Figure 6:
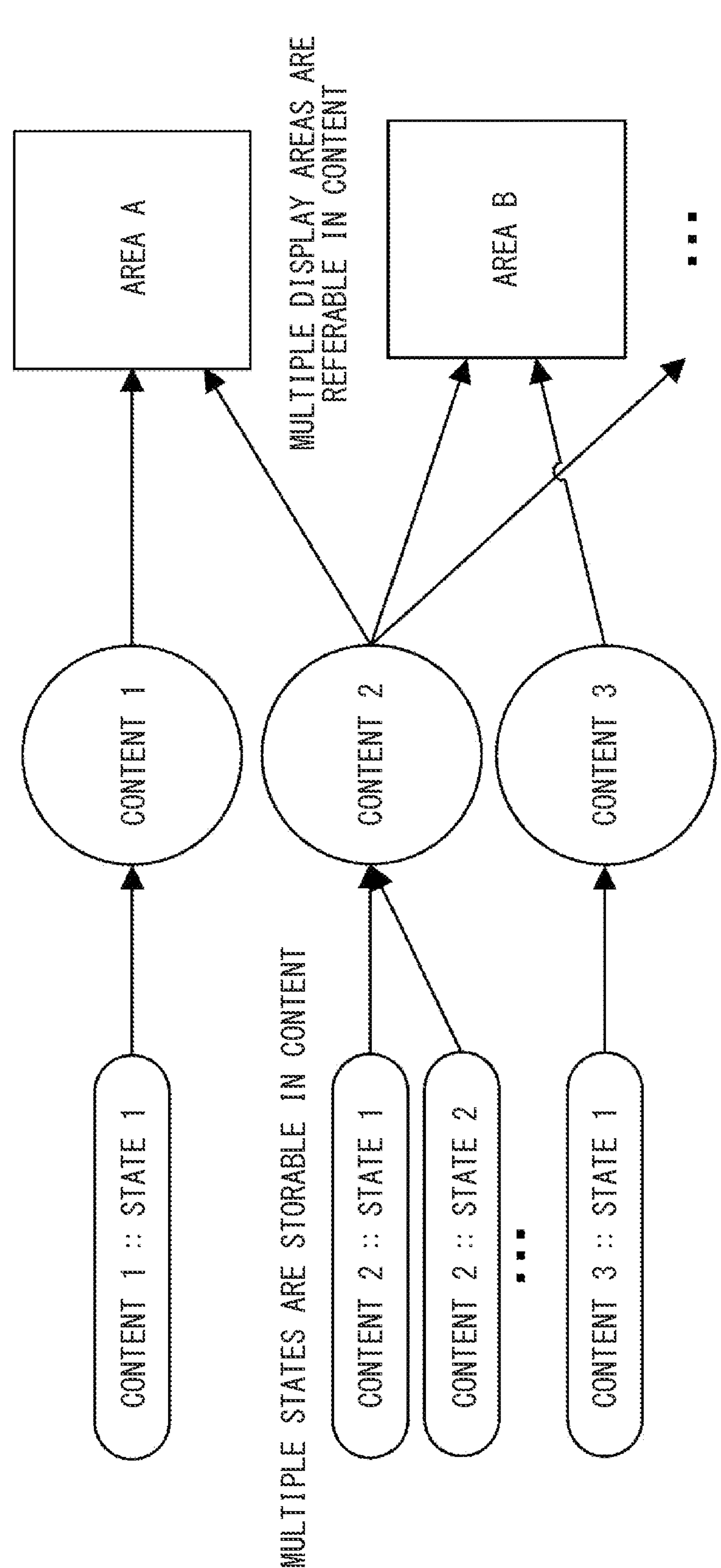
FIG. 6 is a diagram showing the relationship between a content, a state, and an area.

When there are displayable areas, the content can be displayable in any one of areas, and one content can be displayed in areas at the same time. One content can have multiple states, and when the multiple states are held, each state is exclusive and can always be displayed only in one state at a time. The content can have multiple sizes, and when there are multiple sizes, the closest size is displayed according to the size of the display target area. The relationship between a content, a state, and an area is linked as shown in FIG. 6.

The content has properties, and priority and whether or not to withdraw the APP request (i.e., good loser) when size arbitration is lost are set as the properties.

(Priority)

The priority is a value used when the arbitration policy of the area is "priority arbitration", and the content having a high priority is allocated to the area first.

(Size)

The size is the display size of the content and is defined by a vertical size×a horizontal size. When more than one sizes are defined, it is determined according to the size of the area.

(Constraint Expression)

The constraint expression, which may also be referred to as a constraint formula, is a rule that describes the properties that must be exceptionally satisfied during or after arbitration. By suppressing the state of arbitration with a constraint expression, it is possible to express a state that cannot be expressed by the arbitration policy as it is, or to use it for determining the arbitration result after arbitration. That is, for example, depending on the situation such as the running state of the vehicle, it may be better not to display even the content allocated by the arbitration policy. The constraint expression defines the conditions for content suppression and area suppression, which are the conditions that the arbitration result must satisfy.

The logical expression that can be handled by the constraint expression are the content state, the area state, the content being displayed in the area, the set of the area and the content, the scene state, the logical operation, and the quantification symbol. The scene is, for example, a manual driving scene or an automatic driving scene by the autonomous driving device 19 and output control is possible in which the content of the manual driving content group is not displayed in the autonomous driving scene. (a) The content state is either active/inactive or displayed/hidden. (b) The area state is either displayed or hidden. (c) The logical operations include NOT (!), AND, OR, implication (→), and equal sign (=). The quantification symbols include (For all: the condition is satisfied for all elements of the set) and ∃ (Exists: at least one element satisfying that the condition exists in the set). (d) The constraint expression affects the result of the arbitration logic, and the arbitration logic i set to satisfy all constraints. (e) Post-processing has a property (i.e., good loser) that specifies the waiting for APP requests after arbitration in a particular content. It does not affect the result of the arbitration logic since only the wait state of the content after arbitration changes.

(Content Suppression)

For example, "central area. displaying Content ( )=c1→! C2. is Visible ( )" is exemplified as a constraint expression that the content c2 is not displayed while the content c1 is being displayed. This constraint expression describes the suppression that the content c2 is not displayed when the content c1 is being displayed in the central area.

(Priority Arbitration and Latter Win Arbitration)

When priority arbitration and latter win arbitration coexist, it is possible to handle them by setting the arbitration policy of the area to the latter win policy and by describing only the relationship between the contents related to the priority with a constraint equation. As such a constraint expression, "TEL. is Active ( )→For All MM type interrupt (other than TEL) {x|! X. is Visible ( )}" is illustrated. The arbitration policy is the area of the latter win arbitration, and describes the suppression that all multimedia type interrupts (other than the telephone) are not displayed when the content with the high priority, i.e., the telephone, is active by adding this constraint equation.

(Arbitration Logic)

The arbitration logic is an algorithm that defines how to allocate the content to satisfy a constraint equation based on an area arbitration policy according to a predetermined rule. Basically, each area is arbitrated in order of priority, but when it is determined that the constraint expression with the operator defined by implication is different from the specification developer's intention, the area is returned to the previous area and re-arbitration is executed. The arbitration logic includes arbitration within the area and arbitration for the entire area.

(Arbitration within Area)

(a) In the arbitration within the area, the area in the priority arbitration and the latter-content-win arbitration is arbitrated in the descending order of priority. (b) Temporarily assign the highest priority content, and when the evaluation result of the constraint expression is true, determine the temporarily allocated content. When the evaluation result of the constraint expression is false, then re-evaluate the next highest priority content. When there is no content that satisfies the constraint expression, no content is displayed in that area.

(Arbitration of Entire Area)

The arbitration (value-based arbitration) for the entire area includes best fit logic and one-pass logic. (a) The best fit logic selects the highest total value among all the combinations of the contents satisfying the constraint expression and the areas. (b) The one-pass logic allocates the content with the highest priority to the area in order from the area with the higher priority, and excludes the content already allocated to the other area. In this embodiment, the one-pass logic is adopted, alternatively, the best-fit logic may be adopted.

(Implication in Constraint Expression)

Figure 8:
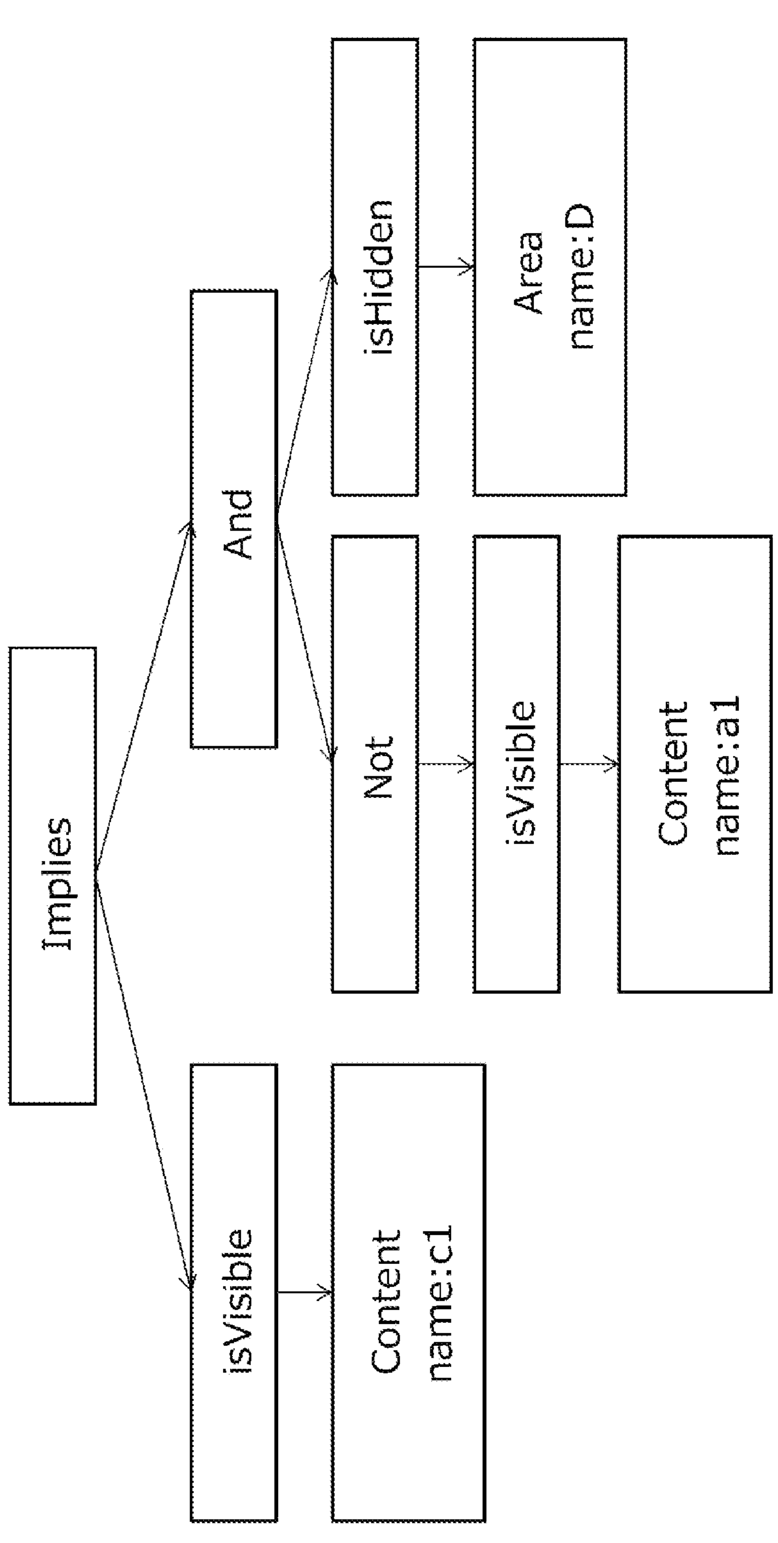
FIG. 8 is a diagram showing the data structure of a constraint expression object.

In the arbitration logic, the "implication" in the constraint expression has a meaning as a condition for re-arbitration, so the implication will be explained below. The implication in proposition logic can be described as "P→Q", and the left side is defined as the premise part and the right side is the conclusion part. The definition of truth values (i.e., truth table) is as shown in FIG. 7. In the axiom system in the proposition logic, the implication is defined as the expression of "P→Q≡¬P∨Q". Also, since the data structure of the constraint expression object is a syntax tree as shown in FIG. 8, it is possible to determine the left side and the right side of the implication.

(Difference Between Implication and Logic Value)

Figures 9, 10:
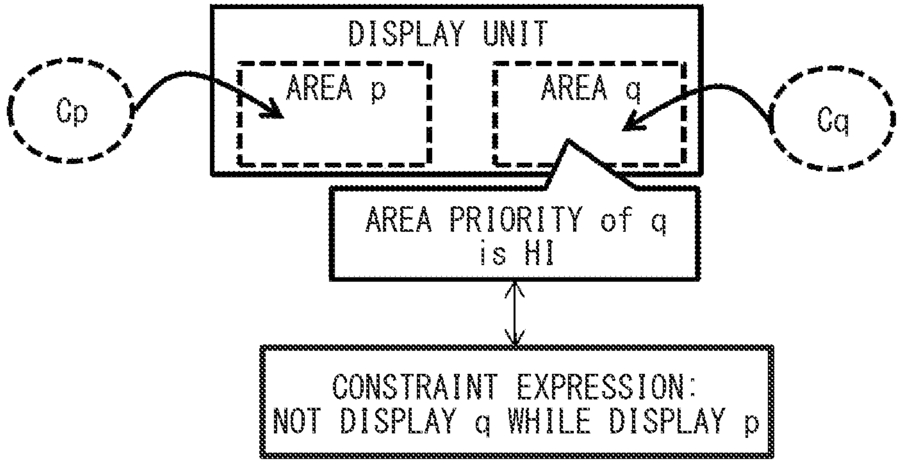
FIG. 9 is a diagram showing a truth value in a case where an evaluation value is true when the left side of the constraint expression is false.
FIG. 10 is a diagram showing the relationship between area priorities and constraint expressions.

The expression of "P→Q" is true when both P and Q are true. In other words, the constraint expression is true when P is false regardless of Q. When the implication is used in a constraint expression, the specification developer may often intend that "the right side is judged after the left side is established." That is, the implicit intention is that there is an order, and the right side is to be established after the left side is established. However, logically, after determining the truth of the right side of the implication, if the left side is set to false regardless of the truth of the right side, the result is true. This treatment has no problem in view of the logic, i.e., the semantic theory of the implication. This means that, in order to satisfy the constraint expression by the arbitration logic, the constraint expression can be satisfied by forcibly making all of the left side of the implication false, as shown in FIG. 9. The one-pass logic determines the content allocated to an area according to the priority order of the areas. That is, the left and right sides of the implication are not related. On the other hand, the intention of the constraint expression of implication is "when the right side is judged after the left side is established", and the left side and the right side of the implication are related. The purpose of re-arbitration is to solve this difficulty.

The re-arbitration of the constraint expression with the implication will now be described. An example case is described such that a constraint expression is described as "P→Q" and an area p relates to P and an area q relates to Q as shown in FIG. 10. Note that the area priority is defined as "p<q". A specific example of the constraint expression is "p. is Display ( )→q. is Hidden ( )", which means "do not display q while displaying p". The arbitration logic will be described when there is a content Cp related to area p and a content Cq related to area q, and APP requests occur simultaneously. Firstly, determine the content of the area q by one-pass logic. As a result, the content Cq is allocated to the area q. In this case, the evaluation of the constraint expression skips the area p since there is an unallocated area on the left side. Secondly, the content of the area p as the next area is determined by the one-pass logic as follows. After tentatively allocating the content Cp to the area p, evaluate the constraint expression of "p.is Display( )→q.is Hidden( )". In this case, since the evaluation is defined as "true→false", the evaluation result of the constraint expression is false. Since the right side of the implication (i.e., the area q) has been arbitrated, the area q is re-arbitrated. Specifically, the assignment of the content Cp is determined as proper, and the assignment of the content in area q is executed again. Thirdly, the content of area q, which is the next area, is determined as follows since the re-arbitration has been executed. When the content Cq is tentatively allocated to the area q, the evaluation is defined as "true→false", so that the tentative assignment of the content Cq is cancelled, and no content is allocated to the area q, and then, the process ends. As a result of the above operation, while the content Cp is being displayed in the area P, the content assignment of the area q is eliminated, and the result as intended by the constraint expression is obtained.

The arbitration logic evaluates the constraint expressions by arbitrating in order from the area with the highest priority. Thus, the right side of the implication (i.e., the conclusion part) may be determined first, and then the left side of the implication (i.e., the premise part) may be determined, according to the description method of the implication in the constraint expression and the level of the priority in the area. In such a case, if all of the left side is set to be false, it is logically correct, but there may be a gap with the specification developer's intention of "after the left side is established" as described above. As such an example, as shown in FIG. 11, the area A can display the content a1 and wins latter, the area B can display the content b1 and wins latter, and the priority relationship between areas is "area A>area B", and the constraint expression exemplifies "b1. is Visible ( )→!a1. is Visible". When the APP request is turned on in the order of the content a1 and the content b1, the content a1 is displayed in the area A and then the content b1 is displayed in the area B according to the latter-win arbitration policy. In this case, since the content a1 of the area A with a high priority is judged first, the right side of the constraint expression is judged first, and the right side of the constraint expression becomes false first. In this case, if the left side of the constraint expression is forcibly set to false, the evaluation result of the constraint expression becomes true. Therefore, if interpreted logically, the content a1 is determined to be displayed, and the content b1 is determined to be not display.

Since the intention of the specification developer is to determine the not-display of the content a1 after the content b1 is determined to be displayed, the intention of the specification developer is not reflected. In other words, the arbitration logic should eliminate the gap between the intention of the specification developer and the arbitration behavior as much as possible. As a result, instead of applying arbitration in a one-way starting from the highest priority area, if the constraint expression becomes an unintended state as described above, it is necessary to execute a recursive arbitration logic that arbitrates again. For this reason, this embodiment employs the recursive arbitration logic.

(Behavior)

The recursive arbitration logic includes an arbitration process that assigns the content to an area and a post-process that changes the state of the request after the arbitration process. It also evaluates all constraint expressions to check whether the arbitration process has been successful.

(Behavior of Entire Arbitration Logic)

Figure 12:
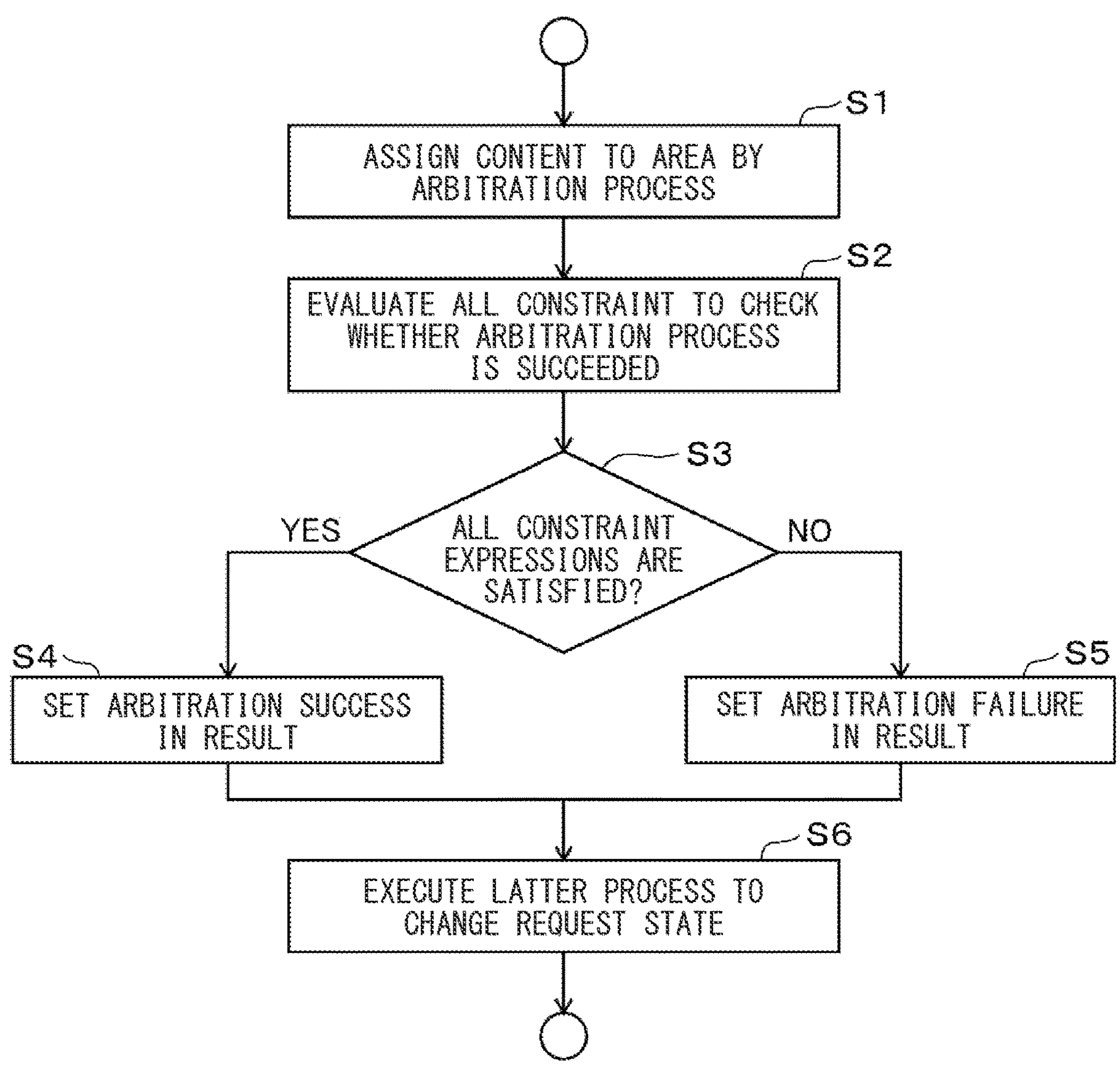
FIG. 12 is a flow chart showing the behavior of the overall arbitration logic.

As shown in FIG. 12, the display control device 10 executes arbitration processing, assigns contents to areas (at S1), evaluates all constraint expressions, and checks whether the arbitration processing has been successful (at S2). When the display control device 10 determines that all the constraint expressions have been satisfied and determines that the arbitration process has succeeded ("YES" at S3), it sets arbitration success to the result and confirms the arbitration (at S4). When the display control device 10 determines that any one of the constraint expressions is not satisfied and determines that the arbitration process has failed ("NO" at S3), it sets arbitration failure to the result (at S5). The display control device 10 executes post-processing and changes the state of the request (at S6).

(Operation of Arbitration Process)

As shown in FIG. 13, the display control device 10 selects an area as an arbitration target in descending order of priority (at S11), and if there is the arbitration target area (at S12), it proceeds to the area arbitration. In the area arbitration, the display control device 10 determines the order of contents as the arbitration target in the area based on the arbitration policy (at S13). If there is no arbitration target area, the loop ends. When there is the content as the arbitration target in the area (at S14), the display control device 10 assigns the content to the area (at S15). If there is no arbitration target area, the loop ends.

The display control device 10 evaluates the constraint expression (at S16), determines whether or not the constraint expression is satisfied (at S17), and exits the area arbitration when determining that the constraint expression is satisfied ("YES" at S17). When the display control device 10 determines that the constraint expression is not satisfied ("NO" at S17), it determines whether or not there is a case where the right side of the implication has already been determined and the left side is determined next (at S18). When the display control device 10 determines that there is a case ("YES" at S18), it determines whether or not the area related to the right side of the implication has already been re-arbitrated (at S19).

If the display control device 10 determines that there is no case ("NO" at S18), or if there is a case but determined that the area related to the right side of the implication has already been re-arbitrated ("YES" at S19), the device 10 cancels the assignment of the content (at S21), shifts to the arbitration target content in the next area (at S22), and exits the area arbitration.

On the other hand, when the display control device 10 determines that the area related to the right side of the implication has not been re-arbitrated yet ("NO" at S19), the display control device 10 adds the area related to the right side of the implication in the order following the arbitration target area (at S20). When the display control device 10 determines that all the loops for shifting to the next arbitration target area have ended and there is no arbitration target area (at S23), the display control device 10 arbitrates only once all the areas without re-arbitrating all the areas (at S24).

(Request from APP)

Figure 14:
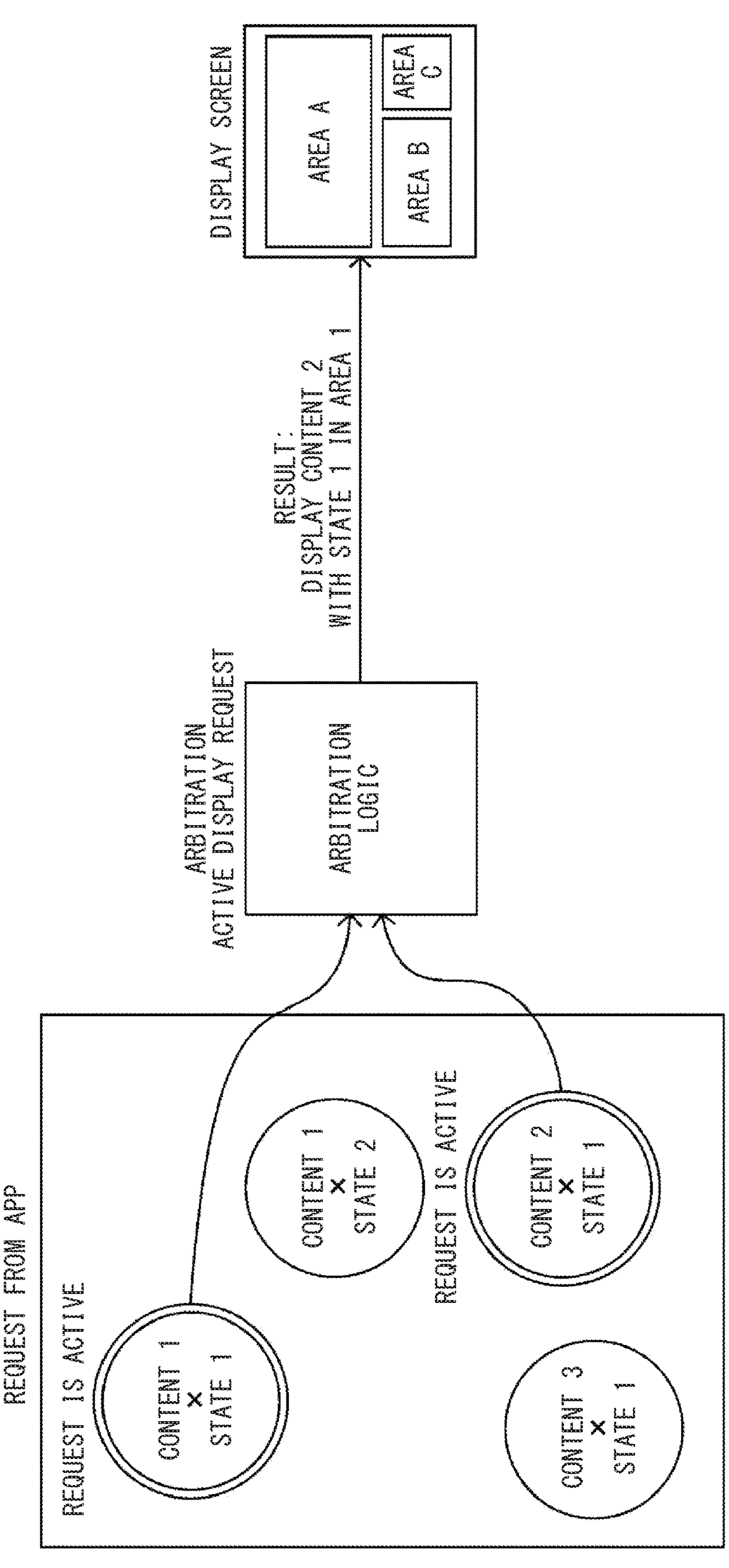
FIG. 14 is a diagram showing the concept of an APP request.

The APP request passes the value of the "content x state" to the arbitration logic as a request from the application, as shown in FIG. 14. The requests do not occur at the same time and always follow an order. It is also influenced to the post-processing that changes the state of the request after arbitration. The arbitration logic arbitrates for the content (and state) in which the APP request occurs. Therefore, the displayed content must at least output an APP request.

An APP request is an APP request for a content, and when an APP request occurs, the corresponding content is arbitrated and displayed in the area after satisfying the constraint expression. Specifically, an APP request is made, and areas to be arbitrated are selected in descending order of area priority. Next, arbitration is executed according to the arbitration policy of each area. That is, the content list is sorted according to the arbitration policy, in order of priority for priority arbitration, and in order of latter win for latter win arbitration.

Next, the content in the content list and the constraint expression are compared to determine whether the content can be displayed. The content not to be displayed is removed from the list. That is, a content is allocated and a constraint expression is evaluated. In this case, the constraint expressions are evaluated rather than compared, so if all are true, the content assignment is proper. The re-arbitration is executed when there is a possibility that it does not correspond to the intension since the constraint expression evaluation is false and the content assignment is not allowed. Next, display areas are allocated in order of the sorted content list, and the above process is repeated until there are no more areas to be arbitrated.

The timing of sort of the content list is before allocating the content to each area. The content list is created prior to each area assignment. Here, the content that can be displayed is determined for each area. Therefore, the content list is always sorted and filtered by constraint expressions prior to area assignment. That is, it is determined whether or not the area can be allocated.

Figure 15:
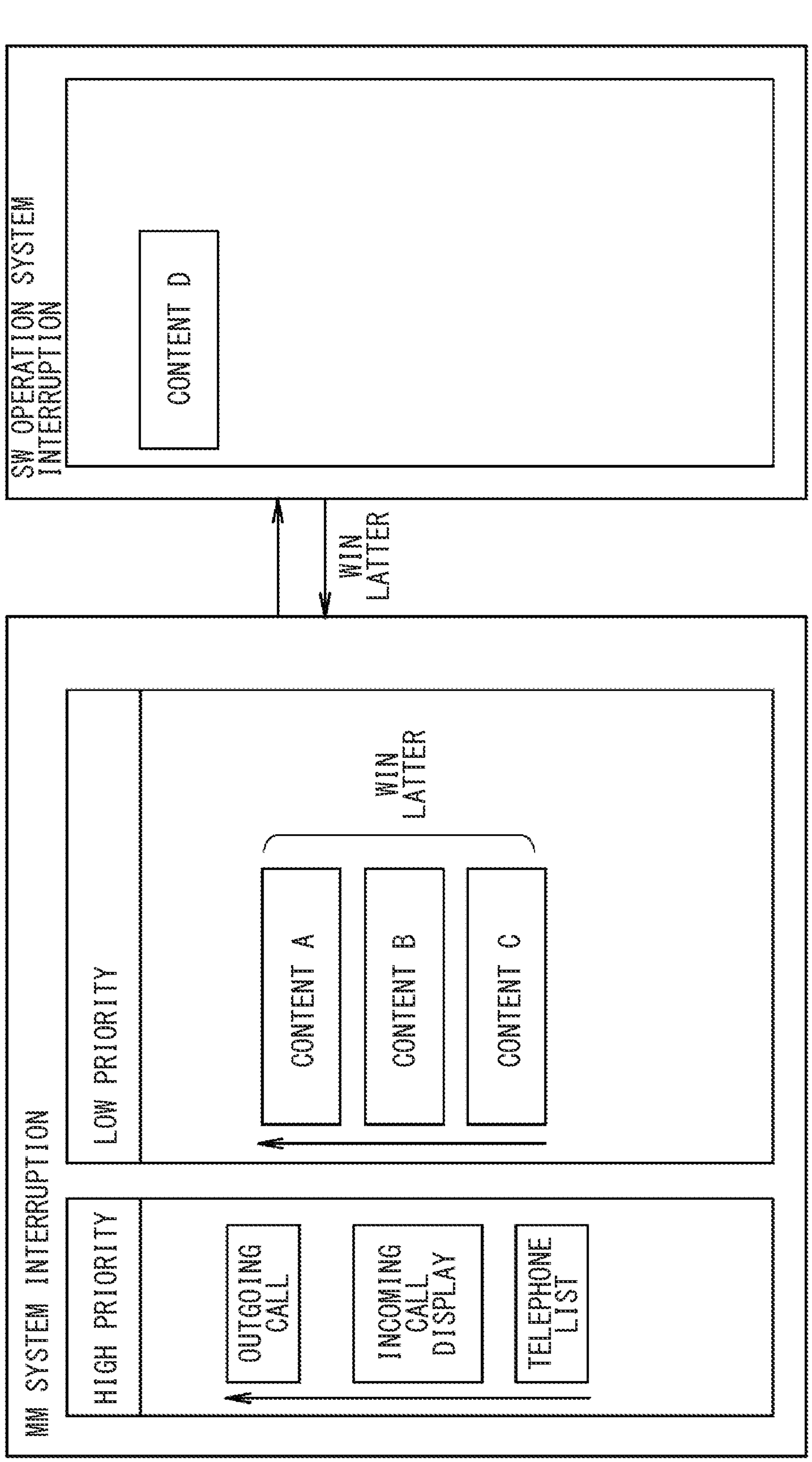
FIG. 15 is a diagram for explaining a case where content is allocated to one area.

Next, the case of arbitrating the content allocated to one area will be described. As shown in FIG. 15, an example case is described for a multimedia (MM) interrupt and an APP request interrupt for a switch (SW) operation. When the latter-win arbitration and the priority arbitration coexist, basically the latter-win arbitration has the priority, but TEL has the priority in the MM interrupt.

The constraint expression exemplifies "TEL. is Active( )→ For All MM interrupts (other than TEL) {x|!x. is Visible ( )}". This is a constraint that if TEL is active, no MM interrupts (other than TEL) are displayed. The TEL content can have three states of "calling", "incoming call display", and "TEL list", and the priority is changed in each state. The priority of the content with low priority is defined as "content A>content B>content C".

Content suppression means that no interrupt notification is given while content C is being displayed normally. The constraint exemplifies "center. displaying Content ( )=C.→!C notification. is Visible ( )". This is a constraint that if the content C is displayed in the central display area, the notification of the content C is not displayed. As described above, it is possible to display the content intended by the specification developer in one area.

Figure 16:
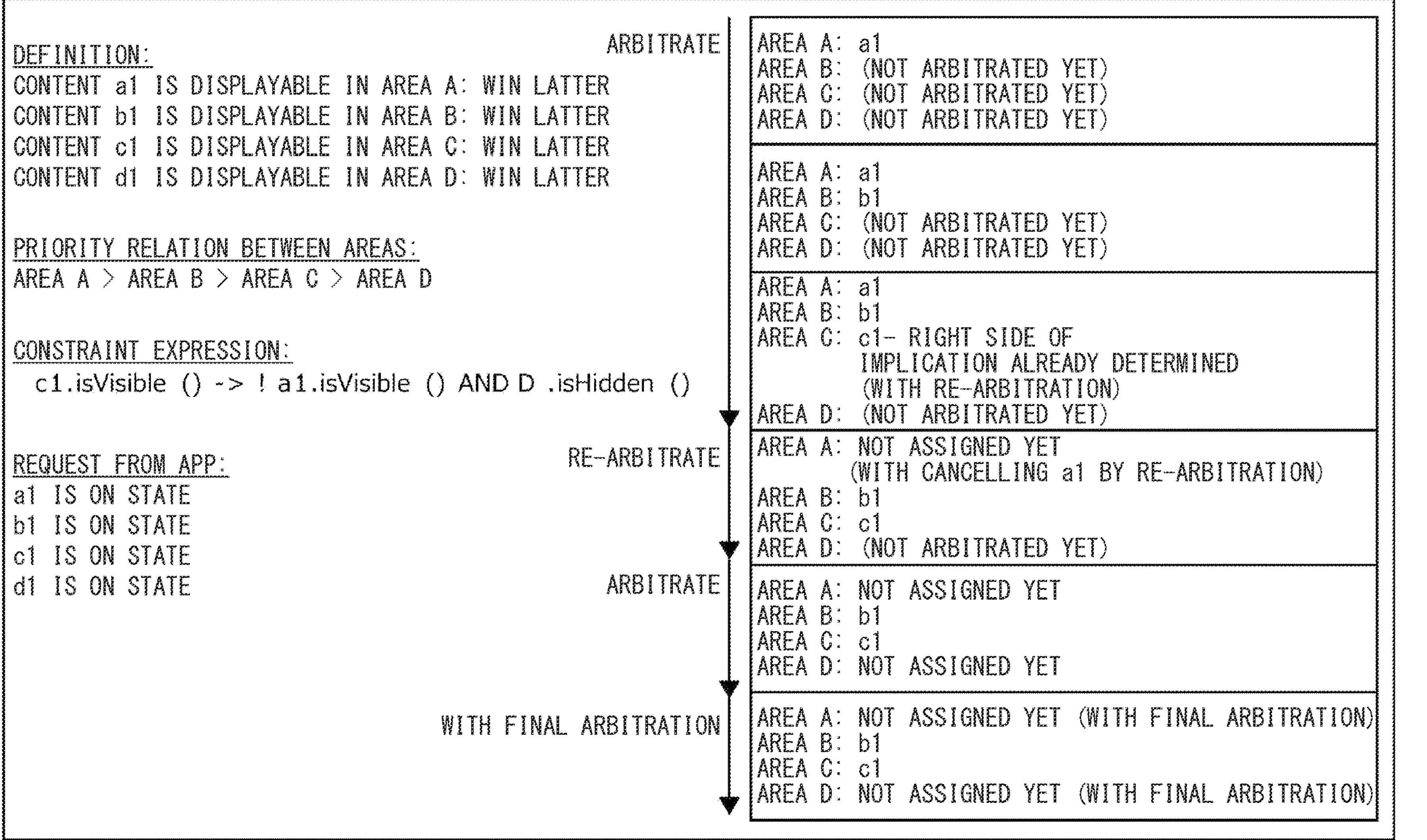
FIG. 16 is a diagram for explaining a case where content is allocated to multiple areas.

Next, the case of arbitrating the content allocated to multiple areas will be described. As shown in FIG. 16, area A can display content a1, area B can display content b1, area C can display content c1, and area D can display content d1. The arbitration policy is the latter-win arbitration for all areas A to C. The priority between areas is defined as "Area A>Area B>Area C>Area D".

The definition of area, content and constraint expression will be explained. As shown in FIG. 17, a name, arbitration policy, and priority are set for each area. A name and displayable area are set for each content. The constraint expression exemplifies "c1. is Visible ( )→!a1. is Visible ( ) AND D. is Hidden( )". The term "Is Hidden ( )" means that the area is not displayed even though there is assignable content in the area. This constraint expression describes the suppression that the content a1 is not displayed while the content c1 (i.e., in the area C) is being displayed, and the area D (which interferes with the area C) is hidden.

When the APP requests are turned on in the order of the content a1, the content b1, the content c1, and the content d1, arbitration is executed from area A in order. The content a1 is allocated to the area A according to the arbitration policy. However, this assignment is the tentative assignment since the determination of the constraint expression cannot be executed. Similarly, the content b1 is tentatively allocated to the area B.

In the arbitration in area C, the content c1 is allocated to the area C according to the arbitration policy, but the right side of the implication in the constraint expression becomes false first. This is because the AND operator will always provide false if one of the two is false.

Therefore, re-arbitration is executed with the content c1 tentatively allocated to the area C, and in the area A, the re-arbitration is executed so that the evaluation result of the constraint expression becomes true. There are two result patterns in which the evaluation result of the constraint expression is true. The result pattern 1 is that when the content c1 is displayed, the content a1 is not displayed and the area D is hidden. As for result pattern 2, if the content c1 is not displayed, the evaluation result of the constraint expression is true. The result pattern 1 corresponds to the intention by the specification developer, but the result pattern 2 is highly likely not to reflect the intention of the specification developer.

In this case, since the right side of the implication has already been determined and the left side is to be determined, re-arbitration is executed. The assignment of the content c1 to the area C is proper, and the re-arbitration in the area on the right side is executed. After the re-arbitration, the area D that has not been arbitrated is arbitrated by returning to the order of the original arbitration. In this case, the area D must be not displayed (i.e., unallocated) in order for the right side of the constraint expression to be true. After that, arbitration is executed only once at the end without re-arbitration. This is mainly arbitration for unallocated areas. As described above, it is possible to display the content intended by the specification developer in multiple areas.

If all of the areas defined in the model are arbitrated for a single request, the number of arbitrations increases in proportion to the expansion of the model, which is sufficient for the recent increase in the content of cockpit displays. The present embodiment adopts a mechanism for reducing the number of times of arbitration.

A case where the definition, the visibility relationship between areas, the constraint expression, and the request generation order are set as the following conditions will be exemplified.

(Definition)

Area A can display content a1; area B can display content b1; area C can display content c1; and area D can display content d1. It is noted that the content a1 may be expressed as a content A1; the content b1 may be expressed as a content B1; the content c1 may be expressed as a content C1; and the content d1 may be expressed as a content D1.

(Visibility Relationship Between Areas)

Area A>Area B>Area C>Area D.

(Constraint Expression)

1. B1.isActive( )→A.isHidden( )
2. D1. isActive( )→B.isHidden( ) AND C.isHidden( )

(Request Generation Order)

Display requests are generated in the order of the content a1, the content b1, the content c1, and the content d1.

In the model described above, if arbitration is executed by the method as shown in FIG. 18, the arbitration is executed for the entire area defined by the model for a single display request, and the number of times of arbitration in total is calculated by the product of the number of areas and the number of receptions of display requests.

In the present embodiment, when receiving a display request from an application, the arbitration unit 13 selects an arbitration target area from the areas defined in the model, and arbitrates the area selected as the arbitration target area. The previous arbitration result is inherited without arbitration for the areas not selected as arbitration target areas (corresponding to an arbitration procedure or an arbitration process). In the model described above, the arbitration unit 13 selects a displayable area of the content through the relationship between the area and the content. According to the definition of the model, the arbitration unit 13 selects the area A as an arbitration target area for the content a1, selects the area B as an arbitration target area for the content b1, selects the area C as an arbitration target area for the content c1, and selects the area D as an arbitration target area for the content d1. The area is affected by the content through the constraint expression. The arbitration unit 13 selects the area A as the arbitration target area for the content b1 based on the constraint expression 1 since the content b1 affects the display state of the area A, and selects the areas B and C as the arbitration target areas for the content d1 based on the constraint expression 2 since the content d1 affects the display state of each of the areas B and C.

The area A is selected as the arbitration target area at the time of receiving the display request of the content a1. The areas A and B are selected as the arbitration target areas at the time of receiving the display request of the content b1. The area C is selected as the arbitration target area at the time of receiving the display request of the content c1. The areas B, C and D are selected as the arbitration target areas at the time of receiving the display request of the content d1.

The display control unit 14 controls the display of the content allocated to the area by the arbitration of the content by the arbitration unit 13 (corresponding to an output control procedure or an output control process). There are three timings for selecting the arbitration target area. The first timing is at the manufacturing of the product. The second timing is at the activation of the software of the product. The third timing is at the reception of a display request from the application.

(At the Time of Manufacturing of Product)

In a situation where the arbitration target area is selected at the time of manufacturing a product including the display control device 10, the information of the arbitration target area is also created at the time of creating the model or at the time of creating the arbitration software, and the created information of the arbitration target area is written into, for example, the ROM, and the information is stored as an initial value in the product.

Procedure 1: At the time of manufacturing the product, the information of the model and the information of arbitration target area created from the information of the model are stored in the product.

Procedure 2: At the time of activating the software of the product, the information of the model and the information of the arbitration target area are read.

Procedure 3: At the time of receiving the display request from the application, the arbitration target area is determined based on the read information of the arbitration target area.

Since the information of the arbitration target area is created at the time of manufacturing of the product, the processing time for selecting the arbitration target area can be omitted from the processing time at the time of using the product.

(At the Time of Activating Product's Software)

In a case where the arbitration target area is selected at the time of activating the software of the product, the information of the arbitration target area is created from the information of the model. The procedure is described as follows. At the time of manufacturing the product, only the information of the model is stored into the product. At the time of activating the software of the product, the information of the model is read, the calculation of selecting the arbitration target area is executed based on the read information of the model, and the information of the arbitration target area is created. At the time of receiving the display request from the application, the arbitration target area is determined based on the created information of the arbitration target area. Since the calculation of selecting the arbitration target area is executed based on the information of the model at the time of activating the software of the product, it is possible to, for example, add the content by installing an application.

(At the Time of Receiving Display Request from Application)

In a case where the arbitration target area is selected at the time of receiving the display request from the application, when the display request of the content is received, the selection of the arbitration target area for the content is executed. The procedure is described as follows.

Procedure 1: At the time of manufacturing the product, only the information of the model is stored into the product.

Procedure 2: At the time of activating the software of the product, the information of the model is read.

Procedure 3: At the time of receiving the display request from the application, the calculation of selecting the arbitration target area is executed based on the read information of the model, the information of the arbitration target area is created, and the arbitration target area is determined from the created information of the arbitration target area.

Since the calculation of selecting the arbitration target area is executed at the time of receiving the display request from the application, the calculation of only the received content is adequate. Therefore, it is possible to shorten the processing time for each selection of the arbitration target area. It may be desirable to select one of the three above-mentioned methods according to the features and the specification of the product.

FIGS. 19 and 20 show the flow of processing in a case where the display request is received in the order of the content a1, the content b1, the content c1 and the content d1.

(At the Time of Receiving Display Request of Content a1)

Since this is the first arbitration and all areas are in a non-arbitration state, all areas are arbitrated at the time of receiving the display request of the content a1 (in other words, at S1).

(At the Time of Receiving Display Request of Content b1)

From the selection of the arbitration target areas, since the arbitration target areas at the time of receiving the display request of content b1 are area A and area B, only the area A and area B are arbitrated; and the area C and area D, which are not arbitration target areas, inherit or take over the previous arbitration result at the time of receiving the display request of the content b1 (in other words, at S2).

(At the Time of Receiving Display Request of Content c1)

From the selection of the arbitration target area, since the arbitration target area at the time of receiving the display request of the content c1 is the area C, only the area C is arbitrated, and the areas A, B, and D which are not the arbitration target areas inherit or take over the results of the previous arbitration at the time of receiving the display request of the content c1 (in other words, at S3).

(At the Time of Receiving Display Request of Content d1)

From the selection of the arbitration target areas, since the arbitration target areas at the time of receiving the display request of content d1 are the area B, area C, and area D, only the area B, area C, and area D are arbitrated at the time of receiving the display request of the content d1 (in other words, at S4). The area A not being the arbitration target area inherits or takes over the previous arbitration result at the time of receiving the display request of the content d1 (in other words, at S4).

The total number of times of arbitration is calculated by the sum of the number of times of arbitration each time the display request of each content is received, instead of the product of the number of areas and the number of receptions of display requests as in a comparative example. That is, the total number of times of arbitration in the comparative example is equal to 16 times. In other words, the number of times of arbitration=number of areas×number of received display requests=4×4=16 times. In contrast, the total number of times of arbitration according to the present embodiment is equal to 10 times. In other words, the number of times of arbitration=the sum of the number of times of arbitration for each reception of a display request=4+2+1+3=10 times.

In the present embodiment, it is possible to attain the same arbitration result as in the comparative example, while reducing the total number of times of arbitration. Therefore, it is possible to avoid situations such as an increase in processing time due to the expansion of the model or the limit of the memory capacity.

According to the present embodiment, the following effects can be obtained. When the display control device 10 receives the display request from the application, the display control device 10 executes the selection of the arbitration target area from the areas defined by the model and executes the arbitration of the area selected as the arbitration target area. The display control device 10 does not execute the arbitration of the area not being selected as the arbitration target area. By selecting the arbitration target area, arbitration can be executed only in the area selected as the arbitration target area. As a result, the number of times of arbitration can be reduced, and expansion of the model can be handled appropriately. Also, the area not selected as the arbitration target area inherits or takes over the previous arbitration result. Previous arbitration results can be used. If the arbitration target area is selected when the product is manufactured, the processing time required for selecting the arbitration target area can be omitted from the processing time when the product is used. If the arbitration target area is selected at the time of activating the software of the product, it is possible to easily deal with the addition of content by, for example, installing an application.

If the calculation of selecting the arbitration target area is executed at the time of receiving the display request from the application, the calculation of only the received content is adequate. Therefore, it is possible to shorten the processing time for each selection of the arbitration target area.

Although the present disclosure has been made in accordance with the embodiments, it is understood that the present disclosure is not limited to such embodiments and structures. The present disclosure incorporates various modifications and variations within a scope of equivalents. Additionally, various combinations and configurations, as well as other combinations and configurations including more, less, or only a single element, are within the scope and spirit of the present disclosure. It may be applied not only to the vehicle but also to the content display control device for purposes other than the vehicle.

The control unit and the method according to the present disclosure may be achieved by a dedicated computer provided by constituting a processor and a memory programmed to execute one or more functions embodied by a computer program. Alternatively, the controllers described in the present disclosure and the methods thereof may be realized by a dedicated computer configured as a processor with one or more dedicated hardware logic circuits. Alternatively, the controller and methods described in the present disclosure may be realized by one or more dedicated computer, which is configured as a combination of a processor and a memory, which are programmed to execute one or more functions, and a processor which is configured with one or more hardware logic circuits. The computer program may be stored in a computer-readable non-transitory tangible storage medium as an instruction to be executed by the computer.

What is claimed is:

1. A content output controller comprising:

a memory storing a rule definition including (i) an arbitration policy that defines a basic arbitration for allocating contents to areas or zones according to a certain priority, (ii) a constraint formula that defines one or more exceptional properties to be satisfied during or after the arbitration, and (iii) instructions; and a processor, wherein the instructions are configured to, when executed by the processor, cause the processor, in response to receiving an output request from an application:

select an arbitration target area from areas defined by a model or an arbitration target zone from zones defined by the model, based on (i) an allocatable relationship between contents indicated by the output request and the areas or the zones defined by the model, and (ii) an influence relationship defined by the constraint formula, wherein the model indicates the areas or the zones in which the content can be outputted and a relationship between the areas or the zones;

execute an arbitration to determine allocation of the contents indicated by the output request to the selected arbitration target area or the selected arbitration target zone in accordance with the rule definition and such that the allocation satisfies the constraint formula;

control output of the contents allocated by the arbitration; and refrain from performing the arbitration for areas other than the selected arbitration target area or zones other than the selected arbitration target zone, and retain a previous result of the arbitration for the areas or the zones for which the arbitration is not performed.

2. The content output controller provided in a product, according to claim 1, wherein execution of the instructions further causes the processor to select the arbitration target area or the arbitration target zone at a time of manufacturing the product.

3. The content output controller provided in a product, according to claim 1, wherein execution of the instructions further causes the processor to select the arbitration target area or the arbitration target zone at a time of activating a software of the product.

4. The content output controller according to claim 1, wherein execution of the instructions further causes the processor to select the arbitration target area or the arbitration target zone at a time of receiving the output request from the application.

5. The content output controller according to claim 1, wherein execution of the instructions further causes the processor to select the arbitration target area or the arbitration target zone based on allocation of the plurality of contents to the plurality of areas or the plurality of zones.

6. The content output controller according to claim 1, wherein execution of the instructions further causes the processor to select the arbitration target area or the arbitration target zone based on the constraint formula.

7. A method of content output control executed by a content output controller including a storage storing a rule definition having (i) an arbitration policy that defines a basic arbitration for allocating contents to areas or zones according to a certain priority and (ii) a constraint formula that defines one or more exceptional properties to be satisfied during or after the arbitration, the method comprising, in response to receiving an output request from an application:

selecting an arbitration target area from areas defined by a model or an arbitration target zone from zones defined by the model, based on (i) an allocatable relationship between contents indicated by the output request and the areas or the zones defined by the model, and (ii) an influence relationship defined by the constraint formula, wherein the model indicates the areas or the zones in which the content can be outputted and a relationship between the areas or the zones;

executing an arbitration to determine allocation of the contents indicated by the output request to the selected arbitration target area or the selected arbitration target zone in accordance with the rule definition and such that the allocation satisfies the constraint formula;

controlling output of the contents allocated by the arbitration; and refraining from performing the arbitration for areas other than the selected arbitration target area or zones other than the selected arbitration target zone, and retaining a previous result of the arbitration for the areas or the zones for which the arbitration is not performed.

8. A non-transitory computer readable medium storing a computer program for use in a content output control device including a storage for storing a rule definition having (i) an arbitration policy that defines a basic arbitration for allocating contents to areas or zones according to a certain priority and (ii) a constraint formula that defines one or more exceptional properties to be satisfied during or after the arbitration, the computer program comprising instructions configured to, when executed by a processor, cause the processor, in response to receiving an output request from an application, to:

select an arbitration target area from areas defined by a model or an arbitration target zone from zones defined by the model, based on (i) an allocatable relationship between contents indicated by the output request and the areas or the zones defined by the model, and (ii) an influence relationship defined by the constraint formula, wherein the model indicates the areas or the zones in which the content can be outputted and a relationship between the areas or the zones:

execute an arbitration to determine allocation of the contents indicated by the output request to the selected arbitration target area or the selected arbitration target zone in accordance with the rule definition and such that the allocation satisfies the constraint formula;

control output of the contents allocated by the arbitration; and refrain from performing the arbitration for areas other than the selected arbitration target area or zones other than the selected arbitration target zone, and retaining a previous result of the arbitration for the areas or the zones for which the arbitration is not performed.

* * * * *